United States Patent
Tajima

(10) Patent No.: US 7,315,127 B2
(45) Date of Patent: Jan. 1, 2008

(54) VEHICLE LAMP

(75) Inventor: Keiichi Tajima, Shizuoka (JP)

(73) Assignee: Koito Manufacturing Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 11/545,054

(22) Filed: Oct. 6, 2006

(65) Prior Publication Data

US 2007/0082577 A1    Apr. 12, 2007

(30) Foreign Application Priority Data

Oct. 6, 2005   (JP)   ............ P. 2005-293563
Aug. 7, 2006   (JP)   ............ P. 2006-214553

(51) Int. Cl.
*B60Q 1/02* (2006.01)
*B60Q 3/00* (2006.01)
*B60Q 1/00* (2006.01)

(52) U.S. Cl. ............ 315/82; 362/459; 362/464; 362/523; 362/546

(58) Field of Classification Search ......... 362/37, 362/53, 459, 487, 464, 512, 523, 546; 315/77, 315/82; 340/935; 307/9.1, 10.1
See application file for complete search history.

(56) References Cited

U.S. PATENT DOCUMENTS 4,954,933 A    9/1990   Wassen
6,565,245 B2 *  5/2003   Yokoi ............ 362/512
6,607,295 B2 *  8/2003   Hayakawa ........ 362/517
6,960,006 B2 * 11/2005   Abe ............. 362/538
2004/0057243 A1  3/2004  Takii et al.

FOREIGN PATENT DOCUMENTS

| DE | 617982 | 8/1935 |
|----|--------|--------|
| DE | 10247381 | 4/2004 |
| EP | 0 588 725 | 3/1994 |
| EP | 1 270 323 | 1/2003 |
| JP | 2003-054310 | 2/2003 |
| JP | 2005-119463 | 5/2005 |
| JP | 2005-186731 | 7/2005 |

\* cited by examiner

*Primary Examiner*—Thuy Vinh Tran
(74) *Attorney, Agent, or Firm*—Fish & Richardson P.C.

(57) ABSTRACT

A vehicle lamp 10 is provided with a lamp unit 30 which applies beams of the desired patterns ahead, and a double axis actuator 50 having a first drive mode in which the lamp unit is rotated in one of two planes that are orthogonal to each other and a second drive mode in which the lamp unit is rotated in the other of the two planes. The double axis actuator is provided with a single output part 540 which rotates the lamp unit in the two planes, and a drive part (including a drive source 550 and a movable part 561) which drives the output part. The double axis actuator can rotate the lamp unit in the each plane regardless of the rotational positions along the above two planes.

16 Claims, 12 Drawing Sheets

IN CASE OF TROUBLE OF LEFT MOTOR

IN CASE OF TROUBLE OF RIGHT MOTOR

VEHICLE LAMP

This application claims foreign priority from Japanese Patent Application Nos. 2005-293563 filed on Oct. 6, 2005 and 2006-214553 filed on Aug. 7, 2006, the entire contents of which are hereby incorporated by reference.

BACKGROUND OF THE INVENTION

1. Field of the Invention

The present invention relates to a vehicle lamp in which an irradiation direction is adjustable in a horizontal direction and a vertical direction that are orthogonal to each other.

2. Related Art

There is a vehicle lamp which can adjust an irradiation direction in a horizontal direction and in a vertical direction according to a running condition of the vehicle.

For example, in an automotive headlamp, there is a case where the irradiation direction is too upward or too downward depending on a load. In such the case, it is necessary to change the irradiation direction in the downward direction or in the upward direction timely to correctly make the irradiation direction. Further, in case that the vehicle runs on a zigzag road or turns an intersecting point, it is convenient that the irradiation direction can be changed to the left or right in order to illuminate quickly a road surface in the running direction of the vehicle.

For example, in a vehicle lamp described in JP-A-2005-119463, to achieve the above object, there are provided an actuator for rotating a lamp unit in the horizontal direction and another actuator for tilting the lamp unit in the vertical direction.

Further, in a vehicle lamp described in JP-A-2005-186731, to achieve the above object, there is provided a double axis actuator in which an actuator for rotating a lamp unit in the horizontal direction and another actuator for tilting the lamp unit in the vertical direction are built in a single housing, and output parts of these actuators are respectively coupled to separate portions of the lamp unit.

Further, in a vehicle lamp described in JP-A-2003-054310, to achieve the above object, a single drive part and a single output part are provided, and the output part acts on worked parts of the lamp unit that are different from each other.

In the vehicle lamp described in JP-A-2005-119463, there are separately provided the actuator for rotating the lamp unit in the horizontal direction and another actuator for tilting the lamp unit in the vertical direction. Therefore, the number of attachment steps of the actuator and the number of harnesses for power supply and control increase, which causes increases of space and cost. This is contrary to size-reduction and cost-reduction. Further, in the vehicle lamps provided right and left, the actuators cannot be used in common. This point also causes the increase of cost.

In the vehicle lamp described in JP-A-2005-186731, the two actuators for the two operations are built in the single housing, whereby this vehicle lamp can perform the size reduction and the cost reduction, compared with the vehicle in JP-A-2005-119463. However, since the output part of the actuator for the horizontal rotation and the output part of the actuator for the up-down tilt are respectively located in the separate positions, this double axis actuator can be used in only the lamp unit in which the positional relation between the portions connected to the two output parts is the same. In result, general-purpose properties are poor, and every time the lamp unit is different, a dedicated double axis actuator is required. Further, since the left and right vehicle lamps forms a pair, the dedicated double axis actuator is required for each of the left and right lamp assemblies.

In the vehicle lamp described in JP-A-2003-054310, the above problems in the above two vehicle lamps are eliminated.

However, before one operation, for example, the horizontally rotational operation reaches a limit position, for example, before the lamp unit faces right in front, the tilting operation in the vertical direction cannot be performed. Namely, the operations in the two different directions cannot be independently performed, and the other operation cannot be performed even in case that their operations are put in the any states.

In view of the above problems, an object of the invention is to enable use of a drive unit in many kinds of vehicle lamps thereby to heighten general-purpose properties of the drive unit, enable the independently rotational operations of the lamp unit along two planes orthogonal to each other, and enable the other operation even in case that their operations are put in any states.

SUMMARY OF THE INVENTION

In accordance with one or more embodiments of the present invention, a vehicle lamp is provided with: a lamp unit which applies beams of the desired patterns ahead; and a drive unit that actuates the lamp unit to move in a first drive mode and a second drive mode. The lamp unit is rotated in one of two planes that are orthogonal to each other (a first plane) in the first drive mode, and the lamp unit is rotated in the other of the two planes (a second plane orthogonal to the first plane) in the second drive mode. The drive unit includes a single output part that moves the lamp unit in the two planes, and a drive part that drives the output part. The drive unit actuates the lamp unit independently in each plane regardless of a position of the lamp unit in the two planes.

Therefore, in the vehicle lamp, the lamp unit is coupled to the output of the drive unit at one point, and the drive unit can independently rotate the lamp unit in each plane regardless of the rotational positions of the lamp unit in the above two planes.

Further, in the vehicle lamp, the lamp unit is coupled to the output of the drive unit at one point, so that one drive unit can be used in almost of all kinds of lamp units, and at least many kinds of lamp units. Further, since the drive unit can independently rotate the lamp unit in each plane regardless of the rotational positions of the lamp unit in the two planes, there is no limit in rotation control of the lamp unit, so that beams can be applied in the desired direction.

Further, in the vehicle lamp, the vehicle lamp may include a support shaft which is rotatable and tiltable with respect to a housing. The lamp unit is supported by the support shaft. The output part is coupled with the lamp unit at a portion on the opposite side to a portion where the lamp unit is coupled with the support shaft. The lamp unit is rotated around the support shaft, when the output part rotates, in the first drive mode. The lamp unit is tilted together with the support shaft, when the output part moves linearly in a direction substantially orthogonal to an axial direction of the support shaft, in the second drive mode. Therefore, the support structure of the lamp unit in relation to the housing is simplified, which contributes to cost reduction.

Further, in the vehicle lamp, the output part may be located on a vertical plane including an optical axis of the lamp unit. Therefore, the lamp units having the same structure can be used left and right, which contributes to the cost reduction.

Further, in the vehicle lamp, the drive part may include two drive sources, and two movable parts independently moved by the drive sources. The two drive sources and the two movable parts are arranged in right and left symmetry with a vertical plane including a linear movement direction of the output part.

When the two movable parts are moved in reversed phase, the output part rotates. When the two movable parts are moved in the same phase, the output part linearly moves. Therefore, the driving unit having the same structure can be used in the left and right lamp units, which contributes to the cost reduction.

Further, the vehicle lamp may comprises: an abnormality sensor that detects abnormality of the drive unit; an irradiation position sensor that detects an irradiation position in a vertical direction of the lamp unit; and an abnormal time position controller that positions the lamp unit below a predetermined irradiation position in case that the abnormality sensor detects the abnormality of the drive unit. Therefore, in case that trouble occurs in one of the drive parts, it is possible to prevent the irradiation position from being left above the predetermined position.

In addition, in accordance with one or more embodiments of the present invention, a drive unit for actuating a lamp unit of a vehicle lamp is provided with: a single output part for coupling to the lamp unit; and a drive for driving the single output part, and the single output part is adapted to move such that the lamp unit is rotatable independently in two orthogonal planes.

Further, in the drive unit, the single output part may be adapted to rotate about its axis and move linearly in a direction substantially perpendicular to said axis.

Further, the drive unit may include a slide base which is linearly movable, the single output part being supported by the slide base and rotatable with respect to the slide base.

Further, in the drive unit, the drive may include two drive sources and two movable transmission elements independently associated respectively therewith, the single output part being driven by movement of the transmission elements.

Further, in the drive unit, the transmission elements may be arranged such that when the transmission elements are moved in opposing phase the single output part rotates, and when the transmission elements are moved in the same phase the single output part moves linearly.

Further, in the drive unit, the single output part may be connected to the two transmission elements via respective arms.

Further, in the drive unit, the arms may respectively include coupling holes that are elongated radially about the axis of the single output part.

Further, in the drive unit, the two drive sources may be respectively supported rotatably in the right and left direction.

Further, the drive unit may include: a control circuit for controlling the drive, based on a signal from a sensor, such that the lamp unit is selectively rotatable in one of the two orthogonal planes.

Further, the drive unit may include a connector that receives a control signal from a sensor, and the single output part, the drive, the control circuit and the connector may be accommodated in a housing.

In addition, in accordance with one or more embodiments of the present invention, a drive assembly for actuating the lamp unit is provided with the drive unit and a support for supporting the lamp unit movably about a reference position.

Further, in the drive assembly, the support may include a gimbal.

In addition, in accordance with one or more embodiments of the present invention, a lamp assembly is provided with: the drive assembly; and a lamp unit, and the lamp unit is supported by the support and the single output part of the drive unit is coupled with the lamp unit on an opposite side of the lamp. unit to the support.

Further, in the lamp assembly, the support may include a support shaft, the lamp unit being adapted to be rotated in the first plane around the support shaft, and rotated in the second plane together with the support shaft.

In addition, in accordance with one or more embodiments of the present invention, a lamp assembly is provided with: the drive unit; and a lamp unit coupled with the single output part of the drive unit.

Further, in the lamp assembly, the axis of the single output part may intersect an optical axis of the lamp unit.

In addition, in accordance with one or more embodiments of the present invention, a vehicle lamp assembly is provided with: the drive unit; an abnormality sensor that detects an abnormality of the drive unit; an irradiation position sensor that detects an irradiation position in a vertical direction of the lamp unit; and an abnormal time position controller that positions the lamp unit below a predetermined irradiation position in the vertical direction in case that the abnormality sensor detects abnormality of the drive unit.

Other aspects and advantages of the invention will be apparent from the following description and the appended claims.

BRIEF DESCRIPTION OF THE DRAWINGS

FIG. 1 is a schematically longitudinal sectional view.

FIG. 3 is a plan view shown by cutting the double axis actuator at a portion between a main case body and an upper lid body.

FIG. 10 is a schematically longitudinal sectional view.

DETAILED DESCRIPTION OF THE EXEMPLARY EMBODIMENTS

Exemplary embodiments of the invention will be described with reference to the accompanying drawings. In the exemplary embodiments, a vehicle lamp is applied to an automotive headlamp.

Firstly, referring to FIGS. 1 to 8, a first exemplary embodiment will be described.

Figure 1:
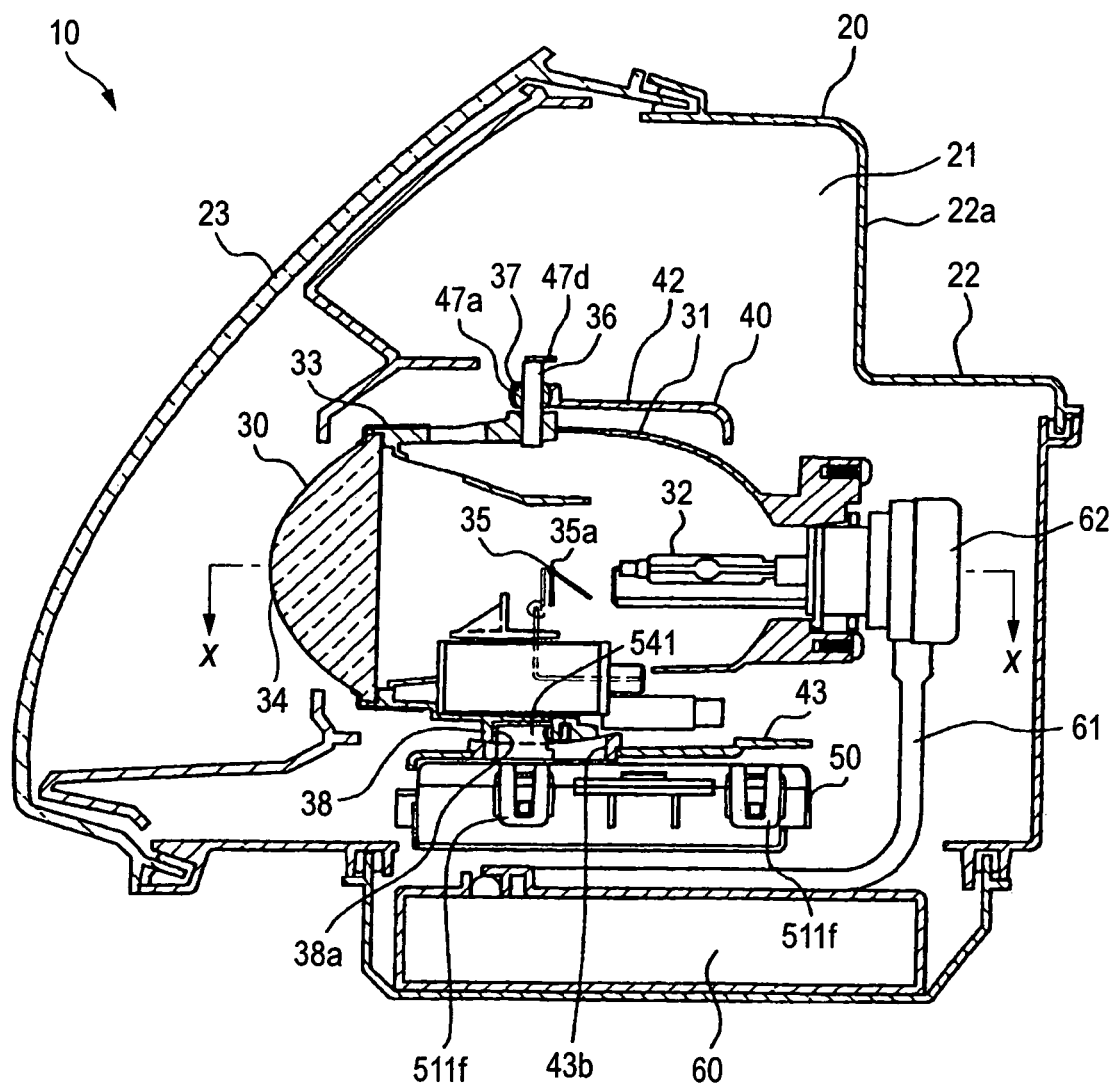
FIG. 1 shows a first exemplary embodiment together with FIGS. 2 to 9(c), in which a vehicle lamp is applied to an automotive headlamp.

With reference to FIG. 1, an outline of an automotive headlamp will be described.

An automotive headlamp 10 includes a housing 20 having a lighting room 21 which is space that is closed nearly airtightly, and a lamp unit 30 which is arranged in the housing 20 rotatably in the vertical direction and in the right and left direction.

The housing 20 is unmoveably fixed to a vehicle body. In the housing 20, a front opening of a lamp body 22 having the shape of a container which opens forward is covered with a transparent cover 23.

In the shown automotive headlamp 10, the lamp unit 30 is supported through a bracket 40 by the lamp body 22 tiltably in the vertical direction and in the right and left direction (horizontal direction). However, the lamp unit 30 may be directly supported by the lamp body 22 rotatably in the vertical direction and in the right and left direction.

A double axis actuator 50 which is a drive unit is supported by the bracket 40, and the lamp unit 30 supported by the bracket 40 rotatably in the vertical direction and in the right and left direction is coupled to an output part of the double axis actuator 50.

Further, in the housing 20, a discharge bulb switching circuit 60 is arranged, and the lamp unit 30 is switched on by the discharge lamp switching circuit 60.

Figure 2:
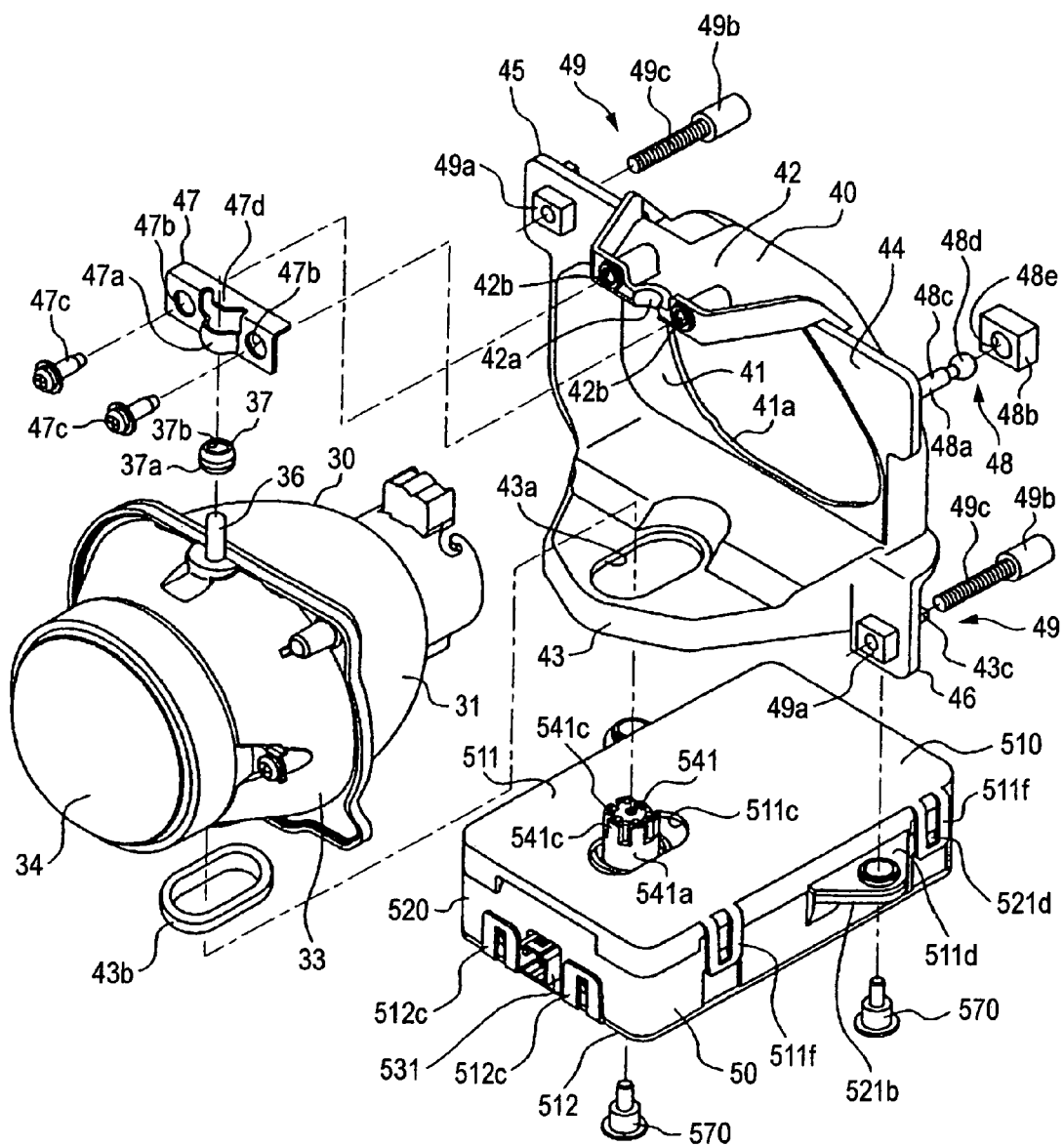
FIG. 2 is an exploded perspective view of a main part.
Figure 3:
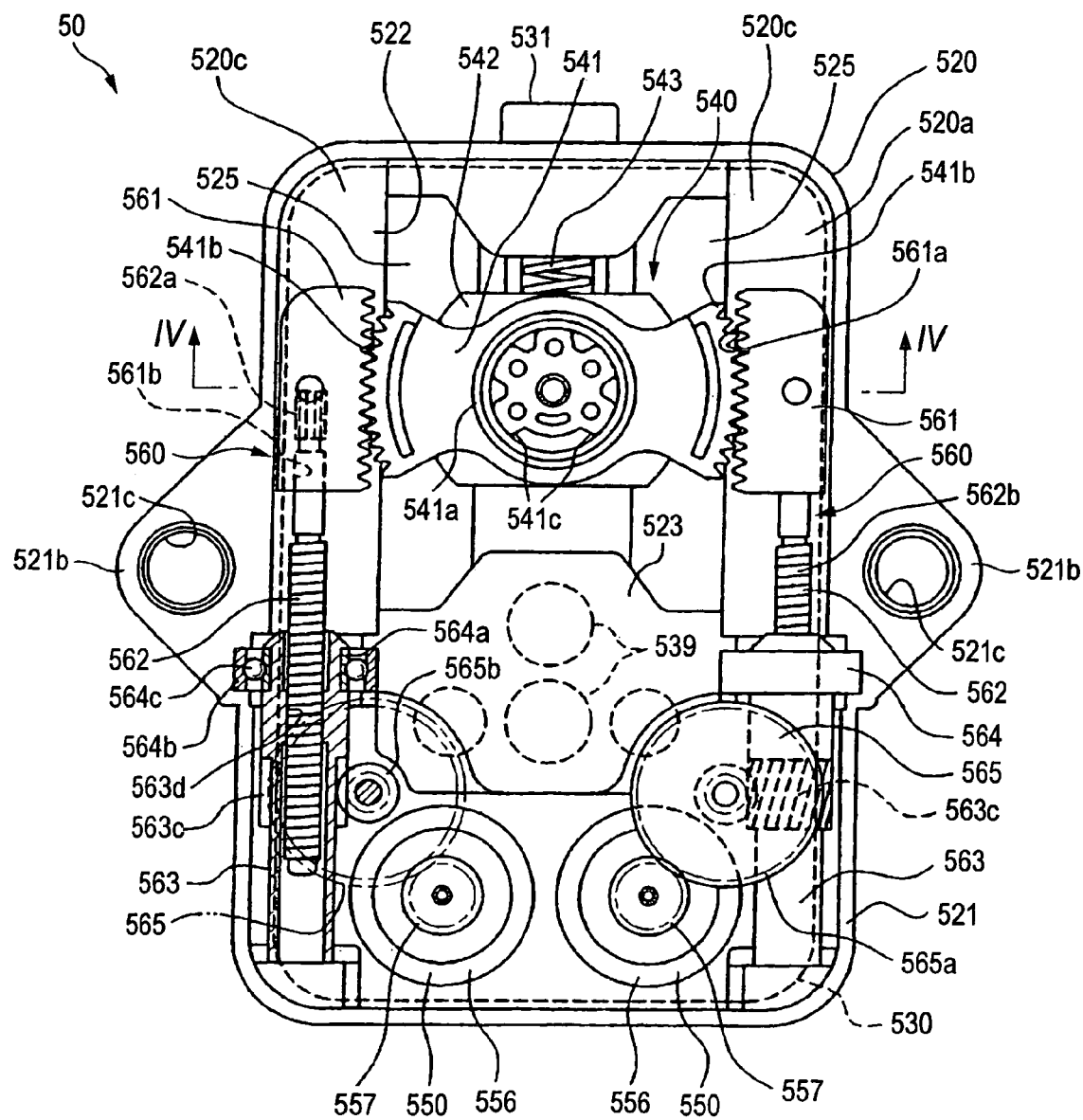
FIG. 3 shows a double axis actuator as a drive unit together with FIGS. 4 to 6.
Figure 4:
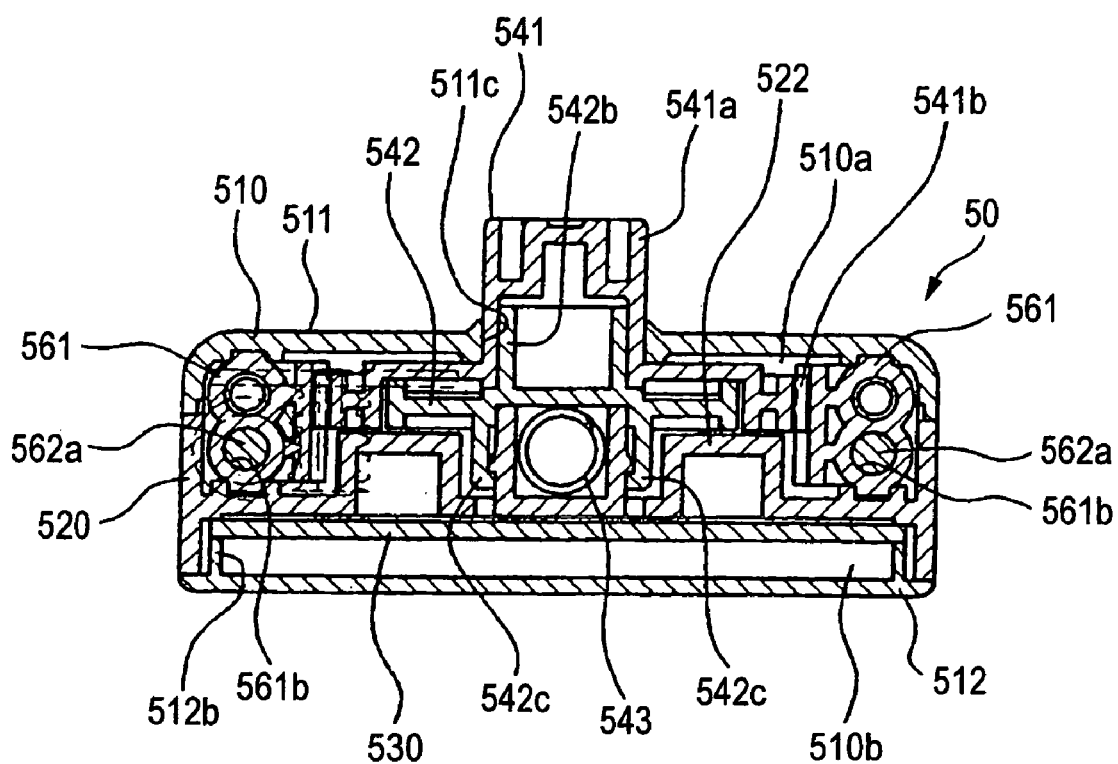
FIG. 4 is a sectional view taken along a line IV-IV of FIG. 3.
Figure 5:
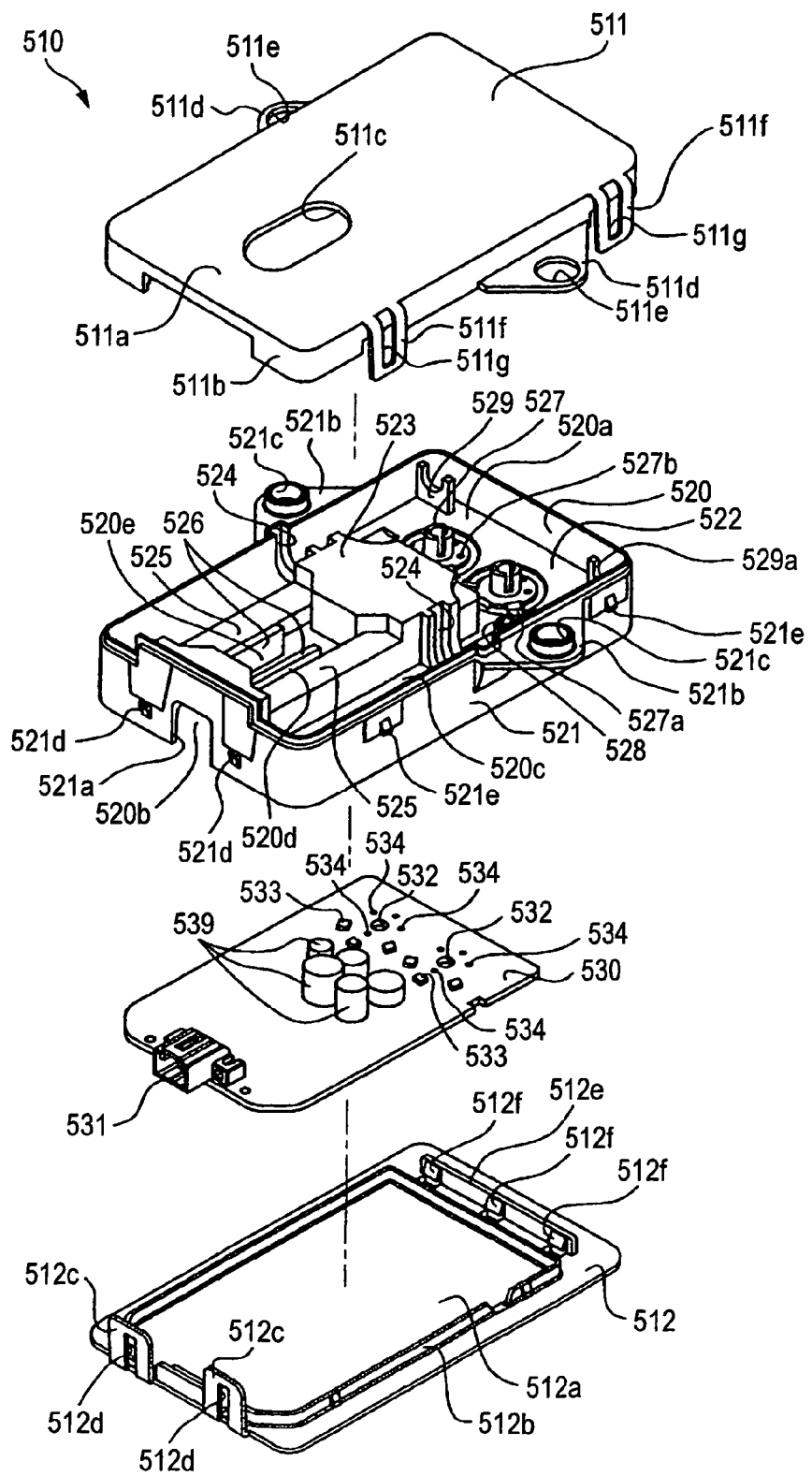
FIG. 5 is an exploded perspective view of a case.
Figure 6:
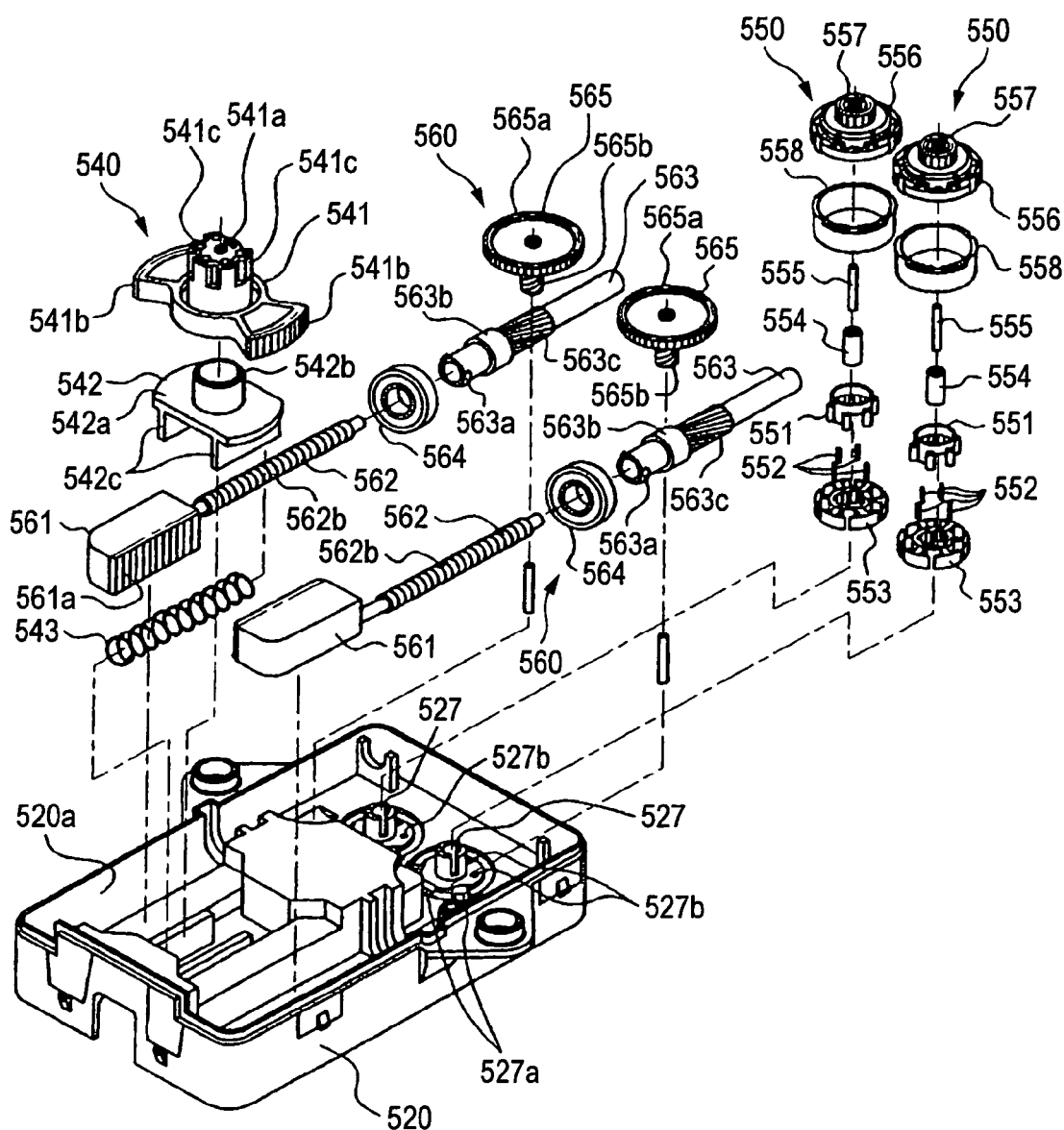
FIG. 6 is an exploded perspective view of a mechanical part.

As known from FIGS. 1 and 2, the lamp unit 30 includes a reflector 31, a discharge bulb 32 supported by the reflector 31, a coupling part 33 attached onto a front end of the reflector 31, a projection lens 34 arranged so as to cover an opening located at a front end of the coupling part 33, and a shade 35 provided for the coupling part 33. The light which is emitted from the discharge bulb 32 and reflected by the reflector 31 is condensed in the vicinity of an upper edge 35a of the shade 35. The condensed light is projected forward by the projection lens 34 having a focus in the vicinity of the upper edge 35a of the shade 35, whereby a beam having the predetermined luminous distribution pattern is formed. The luminous distribution pattern has, on its upper edge, a cut-off line limited by the upper edge 35a of the shade 35.

From the upper surface of the coupling part 33, a shaft 36 is protruded upward, and a self-aligning metal 37 is fitted at the outside of the shaft 36. The self-aligning metal 37 has a peripheral surface 37a having a nearly spherical shape, and a center hole 37b, and the shaft 36 is inserted into the center hole 37b slidably.

In a position of the lower surface of the coupling part 33 corresponding to the shaft 36, a coupling boss 33 is projected. The coupling boss 38 has a nearly circular outer shape, and includes a fitting recess part 38a which opens to the lower surface. On the inner surface of the fitting recess part 38a, not-shown plural engagement notches are provided.

A line connecting an axis of the shaft 36 and an axis of the coupling boss 38 is located on a vertical plane where an optical axis x-x of this lamp unit 30 is located.

The bracket 40, as known from FIGS. 1 and 2, includes a main part 41 formed in the shape of a saucer which opens forward and has a big opening 41a, an upper support piece 42 which projects from the upper end of the main part 41 forward, a lower support piece 43 which projects from the lower end of the main part 41 forward, and coupling pieces 44, 45, 46 which project from three corner portions of the main part 41.

In the center in the left and right direction of the front end portion of the upper support piece 42, a support recess part 42a which dents forward is formed. The forward facing surface of the support recess part 42a is formed in the shape of a concave spherical surface. On both sides of the front end surface of the upper support piece 42 with the support recess part 42a between, threaded holes 42b, 42b are formed. Onto the front end portion of the upper support piece 42, a metal holder 47 is attached. In the center portion in the left and right direction of the metal holder 47, a press part 47a that dents backward is formed. The backward facing surface of the press part 47a is formed in the shape of a concave spherical surface. On both sides of the metal holder 47 with the press part 47a between, screw insertion holes 47b, 47b are formed. Further, at the upper edge portion of the metal holder 47, a regulating part 47d which protrudes backward is formed. In a state where the metal holder 47 is brought into contact with the front end of the upper support piece 42, and the regulating part 47d covers the upsides of the press part 47a and the support recess part 42a, screws 47c, 47c inserted from the front side into the screw insertion holes 47b, 47b are tightened into the threaded holes 42b, 42b of the upper support piece 42, whereby the metal holder 47 is attached onto the front end portion of the upper support piece 42. Hereby, between the support recess part 42a of the upper support piece 42 and the press part 47a of the metal holder 47, a spherical reception concavity is formed.

In a position near the front end of the lower support piece 43, an elongated hole 43a which is elongated in the front and back direction is formed. The nearly central portion in the front and back direction of this elongated hole 43a is located in a position to which the position where the reception concavity is formed corresponds in up-down relation. Into the elongated hole 43a, a thrust metal 43b which is a size smaller than the elongated hole 43a and formed in the shape of a track that is long back and forth is fitted and fixed. The width of the track shaped-opening part of this thrust metal 43b is larger slightly than the outer size of the coupling boss 38 of the lamp unit 30. Further, from the left and right of the back end portion of the lower support piece 43, attachment pieces 43c, 43c (only one is shown in FIG. 2) project, and in the attachment pieces 43c, 43c, not-shown threaded holes are formed.

The coupling boss 38 of the lamp unit 30 is engaged with the thrust metal 43b attached onto the lower support piece 43 of the bracket 40 slidably in the front and back direction, and the self-aligning metal 37 fitted at the outside of the shaft 36 protruding from the upper surface of the lamp unit 30 is rotatably supported by the support recess part 42a of the upper support piece 42 of the bracket 40 and the press part 47a of the metal holder 47. Hereby, the lamp unit 30 is supported through the bracket 40 by the lamp body 22 rotatably in two planes (a first plane and a second plane) that are orthogonal to each other. Namely, the lamp unit 30 can rotate in the plane orthogonal to an axis connecting the shaft 36 and the coupling boss 38 around the axis. Further, by the front and back movement of the coupling boss 38 in the thrust metal 43b, the lamp unit 30 can rotate in the plane including the axis connecting the shaft 36 and the coupling boss 38 and an axis passing through the center in the width direction of the thrust metal 43*b* and extending back and forth.

The bracket 40 is supported by the lamp body 22 tiltably in the vertical direction and in the left and right direction. Namely, the bracket 40 is coupled to a back surface wall 22*a* of the lamp body 22 at the coupling piece 44 by a rotational fulcrum part 48, and at the two coupling pieces 45, 46 by a space adjuster 49, 49.

The rotational fulcrum part 48 includes a fulcrum shaft 48*a* supported by the coupling piece 44, and a ball receiver 48*b* supported by the back surface wall 22*a* of the lamp body 22. The fulcrum shaft 48*a* includes a shaft part 48*c* of which the front end portion is fixed onto the coupling piece 44, and a spherical body 48*d* formed at the back end of the shaft part 48*c*. The spherical body 48*d* is fitted into a spherical recess part 48*e* formed in the ball receiver 48*b*, and the spherical body 48*d* rotates in the spherical recess part 48*e*, whereby the shaft part 48*c* can tilt.

The space adjuster 49 includes a nut body 49*a* supported by the coupling piece 45 (46), and an adjusting shaft 49*b* rotatably supported by the back surface wall 22*a* of the lamp body 22. A screw shaft part 49*c* of the adjusting shaft 49*b* is tightened into the nut body 49*a*.

For example, when the adjusting shaft 49*b* is rotated in the nut body 49*a* supported by the coupling piece 45, the screw shaft part 49*c* is screwed into the nut body 49*a* or loosen from the nut body 49*a* according to the rotational direction of the adjusting shaft 49*b*. Hereby, the space between the coupling piece 45 and the back surface wall 22*a* of the lamp body 22 becomes wide or narrow. Namely, the coupling piece 45 moves forward or backward. Hereby, the bracket 40 tilts nearly in the left and right direction with a line connecting the coupling portion between the spherical body 48*d* of the rotational fulcrum part and the spherical recess part 48*e* to the coupling piece 46 as a rotational axis. Further, when the adjusting shaft 49*b* is rotated in the nut body 49*a* supported by the coupling piece 46, the screw shaft part 49*c* is screwed into the nut body 49*a* or loosen according to the rotational direction of the adjusting shaft 49*b*. Hereby, the space between the coupling piece 46 and the back surface wall 22*a* of the lamp body 22 becomes wide or narrow. Namely, the coupling piece 46 moves forward or backward. Hereby, the bracket 40 tilts nearly in the vertical direction with a line connecting the coupling portion between the spherical body 48*d* of the rotational fulcrum part and the spherical recess part 48*e* to the coupling piece 45 as a rotational axis.

The above double axis actuator 50 is supported by the bracket 40 on the downside of the lower support piece 43 of the bracket 40.

The double axis actuator 50 is a drive unit having a first drive mode in which the lamp unit 30 is rotated in one of two planes that are orthogonal to each other and a second drive mode in which the lamp unit 30 is rotated in the other of the two planes. The double axis actuator 50 will be described in detail with reference to FIGS. 3 to 6.

The double axis actuator 50 includes a mechanism having two functions built in a single casing 510. The casing 510, as known from FIG. 5, includes three parts, that is, a main case body 520, an upper lid body 511 which covers the upper surface of the main case body 520, and a lower bottom plate body 512 which covers the lower surface of the main case body 520.

The main case body 520 is plane-shaped, and has a peripheral wall 521 having a rectangular shape that is long in the front and back direction. The inside of the peripheral wall 521 is divided into upper and lower portions 520*a* and 520*b* by an intermediate wall 522. In the center portion in the left and right direction of the front end portion of the peripheral wall 521, a large notch portion 521*a* which opens downward is formed. On the upper end portions near the back ends on left and right sides of the peripheral wall 521, attachment pieces 521, 521*b* protruding outward are formed, and insertion holes 521*c*, 521*c* are formed in the attachment pieces 521*b*, 521*b*. Further, in positions on the front end surface of the peripheral wall 521, between which the notch portion 521*a* is formed, and in positions on a back end surface which are nearly equally spaced left and right, engagement projections 521*d*, . . . having upward facing engagement surfaces are provided (the projections formed on the back end surface are not shown). Further, in two places on each of the left and right side surfaces of the peripheral wall 521, which are spaced back and forth, engagement projections 521*e*, 521*e* having downward facing surfaces are provided (only projections formed on one side surface are shown).

A central mount 523 of which the upper end is nearly the same in height as the upper end of the peripheral wall 521 is protruded in a position a little toward the back from the center in the front and back direction of the intermediate wall 522. Engagement grooves 524, 524 are formed, continuously extending from both side surfaces of the central mount 523 to the bottoms surface of the intermediate wall 522 and the inner surface of the peripheral wall 521.

Sliding projected-rims 525, 525 which are formed in cross section in the shape of a gate and are lower in protrusion height from the intermediate wall 522 than the central mount 523 are formed, extending from the both side portions of the front surface of the central mount 523 toward the front end of the main case body 520. Between these sliding projected-rims 525, 525 and the side surfaces of the peripheral wall 521, sliding spaces 520*c*, 520*c* are formed. Between the sliding projected-rims 525 and 525, projection walls 526, 526 protruded from the intermediate wall 522 are provided, coming close to the sliding projected-rims 525, 525. Between these projection walls 526, 526 and the sliding projected-rims 525, 525, sliding grooves 520*d*, 520*d* are formed; and between the two projection walls 526 and 526, a spring set space 520*e* is formed. The back end of the projection wall 526, 526 is located considerably apart from the central mount 523.

In a position a little at the back of the central mount 523, two thickish support cylinders 527, 527 arranged right and left are protruded upward from the intermediate wall 522. Further, between these support cylinders 527, 527 and the central mount 523, and in positions near the side surfaces of the peripheral wall 521, thinnish support cylinders 528, 528 are protruded upward from the intermediate wall 522. On a concentric circle about each of the thickish support cylinders 527, 527, . . . , three facing holes 527*a*, 527*a* . . . , are formed. Further, four insertion holes 527*b*, 527*b* . . . , are respectively formed on a concentric circle inside the position where the facing holes 527*a*, 527*a* . . . are formed.

In positions corresponding to the sliding spaces 520*c*, 520*c* on the inner surface of the back end portion of the peripheral wall 521, reception parts 529, 529 are projected. On the upper surfaces of the reception parts 529, 529, reception surfaces 529*a*, 529*a* which open upward and dent in the shape of a semicircle are formed.

The lid body 511 includes a plate-shaped main part 511*a* which has such the size as to cover the upper surface of the main case body 520 entirely and the shape of a rectangle which is long back and forth, and a peripheral wall part 511*b* which protrudes downward from the peripheral edge of the main part 511a. In a position near the front end of the main part 511a, there is formed an insertion hole 511c having the shape of an ellipse that is long in the front and back direction. In positions near the back end of the peripheral wall part 511b, there are formed attachment pieces 511d, 511d protruding outward from the lower end portion. In the attachment pieces 511d, 511d, insertion holes 511e, 511e are formed. Further, in positions at the upper end of the peripheral wall 511b which are spaced back and forth, engagement pieces 511f, 511f, . . . (only one sided-engagement pieces are shown) are protruded downward. In these engagement pieces 511f, 511f, . . . , engagement holes 511g, 511g, . . . are formed.

When the upper lid body 511 is located so as to cover the upper surface of the main case body 520, the elliptic insertion hole 511c is located in a position corresponding to the space between the sliding projected-rims 525 and 525 formed in the main case body 520, and the attachment pieces 511d, 511d are superimposed on the attachment pieces 521b, 521b of the main case body 520. Further, the insertion holes 511e, 511e are put in a superimposed state on the insertion holes 521c, 521c formed in the attachment pieces 521, 521b of the main case body 520. The lower edges of the engagement holes 511g, 511g, . . . of the engagement pieces 511f, 511f, . . . engage with the downward facing engagement surfaces of the engagement projections 521e, 521e, . . . formed on the peripheral wall 521 of the main case body 520, whereby drop-out of the upper lid body 511 from the main case body 520 is prevented.

The lower bottom plate body 512 includes a main part 512a formed in the shape of a rectangular plate which is longer a little in the front and back direction than the size covering entirely the lower surface of the main case body 520, and a peripheral wall part 512b which protrudes upward from the slight inside of the peripheral edge of the main part 512a and is short. In positions at the front end of the main part 512a which are spaced left and right, two engagement pieces 512c, 512c are protruded upward. In these engagement pieces 512c, 512c, engagement holes 512d, 512d are formed. Further, at a back end position of the main part 512a, which is backward apart a little from the back end portion of the peripheral wall part 512b, an engagement wall 512e is installed upright. On a front surface of this engagement wall 512e, three engagement projections 512f, 512f, 512f of which engagement surfaces face downward are provided, which are spaced right and left.

The lower bottom plate body 512 is located so as to cover the lower surface of the main case body 520, the upper edges of the engagement holes 512d, 512d of the engagement pieces 512c, 512c of the lower bottom plate body 512 engage with the upward facing engagement surfaces of the engagement projections 521d, 521s formed on the front surface of the peripheral wall 521 of the main case body 520, and the downward facing engagement surfaces of the engagement projections 512f, 512f, 512f formed on the rear engagement wall 512e engage with the upward facing engagement surfaces of the engagement projections 521d, 521d, 521d formed on the back surface of the peripheral wall 521 of the main case body 520. Hereby, drop-out of the lower bottom plate body 512 from the main case body 520 is prevented.

As described above, the upper lid body 511 is coupled to the main case body 520 so as to cover the upper surface of the main case body 520, and the lower bottom plate body 512 is coupled to the main case body 520 so as to cover the lower surface of the main case body 520, whereby the casing 510 is formed. Between the intermediate wall 522 of the main case body 520 and the upper lid body 511, a mechanism arrangement space 510a is formed; and between the intermediate wall 522 of the main case body 520 and the lower bottom plate body 512, a circuit arrangement space 510b is formed. As known from FIG. 3, the inside of the case body 510 has left and right symmetrical inner structure with a plane passing through a center line by which the casing 510 is divided into left and right parts and extending in the vertical direction.

In the circuit arrangement space 510b, a circuit board 530 on which a control circuit is constituted is arranged. On the circuit board 530, electronic parts are mounted. Onto the center portion in the left and right direction on the upper surface of the front end portion of the circuit board 530, a connector 531 is attached, and the connector 531 is faced outward from the notch part 521a formed in the front surface portion of the peripheral wall 521 of the main case body 520. Further, in the circuit board 530, in positions corresponding to the downsides of the support cylinders 527, 527 formed on the main case body 520, insertion holes 532, 532 are formed. On a concentric circle about each of the insertion holes 532, 532, three Hall elements 533, 533, . . . are mounted. Further, four insertion holes 534, 534, . . . are formed on a concentric circle inside the position where the Hall elements 533, 533, . . . are arranged. The Hall elements 533, 533, . . . are arranged opposed to the facing holes 527a, 527a, . . . formed in the intermediate wall 522 of the main case body 520, and the insertion holes 534, 534, . . . are arranged opposed to the insertion holes 527b, 527b, . . . formed in the intermediate wall 522 of the main case body 520. Further, tall electronic parts 539, 539, . . . arranged on the circuit board 530 are mounted so as to be located in tall space of the downside of the central mount 523 formed in the main case body 520.

In the mechanism arrangement space 510a of the casing 510, a mechanical part is arranged. Since the inside of the casing 510 is divided into the circuit arrangement space 510b where the circuit board 530 is arranged and the mechanism arrangement space 510a where the mechanical part is arranged, it is possible to prevent shavings of each member which are produced from the mechanical part, and oil from affecting the circuit board 530. Therefore, it is possible to elongate the life of the circuit board 530.

The mechanical part includes an output part 540, a drive source 550, and a drive power transmission part 560 which transmits drive power of the drive source 550 to the output part.

The output part 540 includes an output gear 541, a slide base 542, and a compression coil spring 543. The output gear 541 is formed by integrally forming an early cylindrical coupling part 541a and sector gear parts 541b, 541b that protrude from the lower end portion of the coupling part 541a in the opposite directions to each other. On the peripheral surface of the upper end portion of the coupling part 541a, engaging projected rims 541c, 541c, . . . are formed at intervals in the peripheral direction.

In the slide base 542, a cylindrical fitting part 542b is protruded upward from the center of the upper surface of a plate-shaped base 542a, and two plate-shaped sliding legs 542c, 542c are protruded downward from the lower surface of the base 542a, apart right and left from each other. Between back end portions of the two sliding legs 542c, 542c, a not-shown reception plate is formed. In such the slide base 542, the sliding legs 542c, 542c are slidably engaged with the sliding grooves 520d, 520d of the main case body 520, and the not-shown reception plate formed between the back end portions of the sliding legs 542c, 542c is located in the space between the projection walls 526, 526 of the main case body 520 and the central mount 523. Till the slid base 542 moves to the front end in the moving range, the reception plate does not collide with the back ends of the projection walls 526, 526. The compression coil spring 543 is arranged in the spring set space 520e of the main case body 520, and is put in a compressed state between the reception plate of the slide base 542 and the inner surface of the front end portion of the peripheral wall 521 of the main case body 520. Therefore, the slide base 542 is energized backward by the compression coil spring 543.

As described above, the coupling part 541a of the output gear 541 is fitted at the outside of the fitting part 542b of the slide base 542 arranged in the mechanism arrangement space 510a of the casing 510. Hereby, the output gear 541 (as an output shaft) moves together with the slide base 542 in the front and back direction, and is supported by the slide base 542 rotatably around an axis of the fitting part 542b.

The drive sources 550, 550 are constituted as brushless motors. Since the two brushless motors 550, 550 have the same structure, only one will be described. To the support cylinder 527 protruded from the intermediate wall 522 of the main case body 520, an insulator 551 is fixed in a fitting state at the outside of the support cylinder 527. The lower end portions of four terminals 552, 552, . . . supported by the insulator 551 are inserted into the insertion holes 527b, 527b, . . . formed in the intermediate wall 522, and protruded into the circuit arrangement part 510b. Further, the lower end portions of the terminals 552, 552, . . . are inserted into the insertion holes 534, 534, . . . of the circuit board 530, and connected at the back side of the circuit board 530 to a predetermined connection land (not shown) by soldering. A core 553 is fixed onto the main case body 520 so as to be located outside the insulator 551, and a not-shown coil is wounded around the core 553. To the coil, the electric power is supplied through the terminals 552, 552, . . . . The insulator 551, the terminals 552, 552, . . . , the core 553, and the coil constitute a stator part of the brushless motor 550.

To the support cylinder 527, a bearing metal 554 is fixed in a fitting state at the inside of the support cylinder 527, and a shaft 555 is rotatably supported by the bearing metal 554. To the upper end portion of the shaft 555, a rotor member 556 is fixed, and a pinion gear 557 is integrally formed in the center portion of the upper surface of the rotor member 556. A reference numeral 558 is a rotor magnet which is formed nearly in the cylindrical shape and magnetized alternately in the peripheral direction, and its upper end portion is fixed onto the peripheral portion of the rotor member 556. Hereby, the rotor magnet 558 is located so as to surround the core 553 at the outside, and the lower end portion of the rotor magnet 558 is opposed to the Hall elements 533, 533, 533 on the circuit board 530 through the facing holes 527a, 527a, 527a formed in the intermediate wall 522 of the main case body 520.

Therefore, the electric power is applied through the terminals 552, 552, . . . to the coil wound around the core 553, rotational power is produced in the rotor magnet 558, and the rotor constituted by the rotor magnet 558, the rotor member 556 and the shaft 555 rotates.

The drive power transmission part 560 is arranged in left and right pairs. Since the left and right parts have the entirely same constitution except that they have the shapes of left-right surface symmetry, only one part will be described.

The drive power transmission part 560 has a rack member 561, which is arranged in the sliding space 520c of the casing 510 movably in the front and back direction. The rack member 561 forms a rectangular body which is long in the front and back direction, and has rack tooth 561a formed on one side surface. This rack member 561 is a movable part which is moved by the drive source 550, and it is necessary for the drive part to include this rack member 561 that is the movable part and the drive source 550. In the rack member 561, force-fit holes 561b, 561b which open to a back end are formed up and down. A force-fit part 562a is formed at the front end portion of a lead screw 562, and the force-fit part 562a is forced into the lower force-fit hole of the rack member 561. Hereby, to the front end portion of the lead screw 562, the rack member 561 is fixed. In the lead screw 562, screw threads 562b are formed in most of the portions except for the force-fit part 562a. As described above, since the force-fit holes 561b, 561b are formed in the rack member 561 up and down in two stages, the rack members 561, 561 used right and left can have the same structure. Namely, even in case that the rack member 561 is coupled to the lead screw 562 at the position biased downward, by arranging rack members to be arranged left and right in left-right symmetry, the same rack member 561 can be used left and right.

The lead screw 562 is fed by a cylindrical gear 563 in the front and back direction. The cylindrical gear 563 is formed in the shape of a cylinder that is long in the front and back direction. The cylindrical gear 563 has a drop-out preventing projection 563a formed on the peripheral surface of its front end portion; a large-diameter part 563b that is large in outer diameter, and is formed in a slightly backward position of the drop-out preventing projection 563a; and a helical gear 563c formed on the back side of the large-diameter part 563b. On the inner surface of the cylindrical gear 563, a thread groove 563d is formed.

A ball bearing 564 is fitted at the outside of the front end portion of the cylindrical gear 563. In the ball bearing 564, plural balls 564c, 564c, . . . are sealed between an inner race 564a and an outer race 564b, and the outer race 564b and the inner race 564a are constituted so that they can rotate mutually. The inner race 564a is fitted at the outside of the cylindrical gear 563 between the drop-out preventing projection 563a located at the front end of the cylindrical gear 563 and the large-diameter part 563b. Hereby, drop-out of the ball bearing 564 from the cylindrical gear 563 is prevented.

The screw thread 562b of the lead screw is tightened into the thread groove 563d of the cylindrical gear 563, the outer race 564b of the ball bearing 564 is engaged into the engagement groove 524 formed from the central mount 523 of the casing 510 to the inner surface of the peripheral wall 521, and the back end portion of the cylindrical gear 563 is accepted by the reception surface 529a of the reception part 529 formed on the back end portion inner surface of the peripheral wall 521 of the main case body 520. Hereby, the cylindrical gear 563 is rotatably arranged in the casing 510.

Reference numeral 565 is a transmission gear, and the same transmission gears 565, 565 are used left and right. Therefore, only one transmission gear 565 will be described. The transmission gear 565 transmits rotation of the brushless motor 550 to the cylindrical gear 563. The transmission gear 565 is formed by integrally forming a flat gear 565a and a cylindrical worm gear 565b which is protruded downward from the downside of the center portion of the flat gear 565a. The worm gear 565b is rotatably fitted at the outside of the support cylinder 528 provided upright on the intermediate wall 522 of the main case body 520. The worm gear 565b is engaged with the helical gear 563c of the cylindrical gear 563, and the flat gear 565a is engaged with the pinion gear 557 of the motor 550.

In the thus-constituted double axis actuator 50, the screws 570, 570 inserted from the downside into the insertion holes 511e, 511e, 521c, 521c of the attachment pieces 511d, 511d, 521b, 521b are tightened into not-shown thread holes in the attachment pieces 43c, 43c protruded on both sides of the back end portion of the lower support piece 43 of the bracket 40, thereby to be fixed on the downside of the lower support piece 43 of the bracket 40. The coupling part 541a of the output gear 541 of the output part 540 is fitted at the inside of the engagement recess part 38a of the coupling boss 38 of the lamp unit 30 which is engaging with the thrust metal 43b supported by the lower support piece 43 of the bracket 40. Further, the engaging projected-rims 541c, 541c, . . . protruded on the upper end portion peripheral surface of the coupling part 541a are engaged with not-shown engagement notches formed in the inner surface of the engagement recess part 38a, so that the coupling boss 38 and the coupling part 541a of the output gear 541 cannot freely rotate mutually. Further, in the coupling boss 38 and the coupling part 541a of the output gear 541, the mutual axis-down can be produced at a slight angle by tolerance on manufacture.

As a light source of the lamp unit 30, the discharge bulb 32 is used. Therefore, at the lower portion inside the lamp body 22, the discharge bulb switching circuit 60 for switching on the discharge bulb 32 is arranged. To the leading end of a code 61 extending from the discharge bulb switching circuit 60, a bulb socket 62 is connected, and the bulb socket 62 is connected to the discharge bulb 32. Accordingly, the lighting voltage generated in the discharge bulb switching circuit 60 is applied through the bulb socket 62 to the discharge bulb 32, whereby the discharge bulb 32 is switched on.

Action of the above automotive headlamp 10 will be described below.

In the automotive headlamp 10, when the beam irradiation direction is adjusted in the time of forwarding from a manufactory or in the time of an automobile inspection, the adjusting shafts 49b, 49b of the two space adjusters 49, 49 are appropriately operated, and the bracket 40 supporting the lamp unit 30 is tilted up-and-down and left-and-right, whereby the beam irradiation direction is adjusted.

The adjustment of the beam irradiation direction during running is performed by driving the double axis actuator 50.

In case that the beam irradiation direction is tilted in the vertical direction, the two motors 550, 550 are driven so that the two rack members 561, 561 move in the same phase, that is, so that the two rack members 561, 561 move forward or backward together. As the motors 550, 550 are driven, the rotation of the rotor magnets 558, 558 are transmitted through the pinion gears 557, 557 to the flat gears 565a, 565a of the transmission gears 565, 565, and the helical gears 563c, 563c of the cylindrical gears 563, 563 are fed by the worm gears 565b, 565b which rotate together with the flat gears 565a, 565a, whereby the cylindrical gears 563, 563 rotate. As the cylindrical gears 563, 563 rotate, the screw threads 562b, 562b of the lead screws 562, 562 engaged into the thread grooves 563d, 563d of the cylindrical gears 563, 563 are fed in the front and back direction. Therefore, the rack members 561, 561 fixed to the front end portions of the lead screws 562, 562 are moved forward or backward in the sliding spaces 520c, 520c. Since the two rack members 561, 561 are moved forward or backward together, the output gear 541 in which the sector gear portions 541b, 541b engage with the rack teeth 561a, 561a of the rack members 561, 561 is moved forward or backward.

As the output gear 541 of the double axis actuator 50 is thus moved forward or backward, the coupling boss 38 of the lamp unit 30 which is fitting to the coupling part 541a of the output gear 541 is moved forward or backward along the thrust metal 43b supported by the bracket 40. Accordingly, the lamp unit 30 is tilted, with a portion where the self-aligning metal 37 supported by the shaft 36 is supported by the upper support piece 42 of the bracket 40 and the metal holder 47 thereof as a rotational fulcrum, along the vertical surface on which a line connecting the axis of the shaft 36 and the axis of the coupling boss 38 is located, where the optical axis x-x of the lamp unit 30 is located, that is, tilted in the upward direction or the downward direction.

When the beam irradiation direction is rotated in the left and right direction, the two motors 550, 550 are driven so that the two rack members 561, 561 move in reversed phase, that is, so that one rack member 561 moves forward and the other rack member 561 moves backward. The drives of the two motors 550, 550 appear as the movements of the rack members 561, 561 through the above transmission paths. By the movements of the left and right rack members 561, 561 in the opposite directions to each other, the output gear 541 rotates without moving in the front and back direction. By the rotation of the output gear 541, the lamp unit 30 of which the coupling boss 38 is fitting to the coupling part 541a of the output gear 541 rotates around the axis along the plane orthogonal to the axis connecting the shaft 36 and the coupling boss 38. Hereby, the lamp unit 30 is rotated in the left and right direction. Accordingly, the lamp unit 30 can be rotated, regardless of the rotating positions along the two planes, along each plane. Namely, in the middle of tilting in the vertical direction, the lamp unit 30 can be rotated in the left and right direction; and in the middle of rotation in the left and right direction, the lamp unit 30 can be tilted in the vertical direction.

Figure 7:
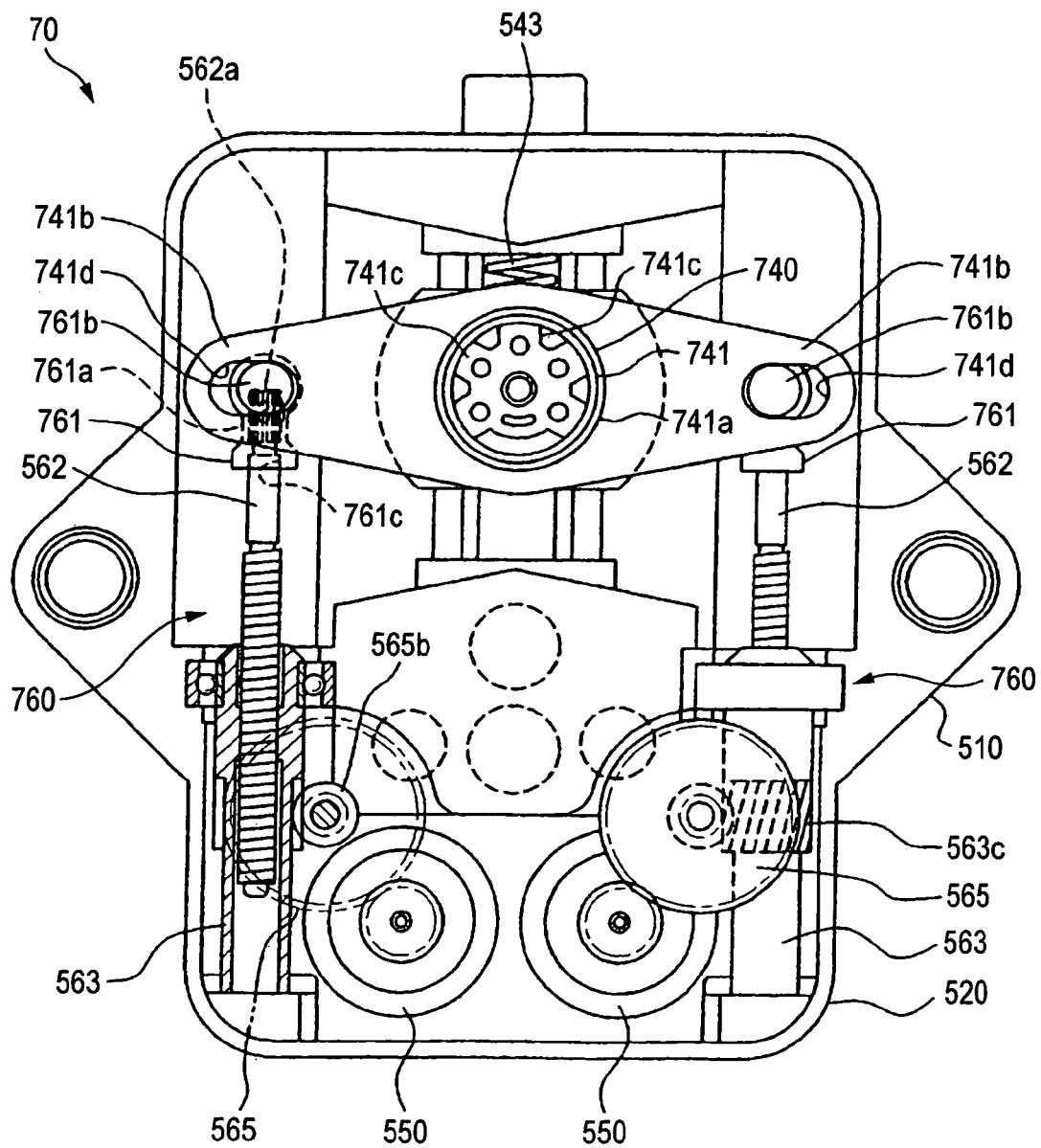
FIG. 7 shows a modified example of the double axis actuator, which is a plan view shown by cutting the double axis actuator at the same portion as the cut portion in FIG. 3.

FIG. 7 shows a modified example 70 of the double axis actuator. This double axis actuator 70 is different from the double axis actuator 50 only in a part of the output part and a part of the drive power transmission part, and it is similar to the double axis actuator 50 in others than the above points. Therefore, here, the points in which the double axis actuator 70 is different from the double axis actuator 50 will be mainly described, and description of other points is omitted.

A casing 510 of the double axis actuator 70 is the same as the above casing 510.

An output part 740 has a slide base 542 and a compression coil spring 543 which are similar to those in the output part 540. Though an output gear 741 is also nearly similar to the output gear 541, it has arm parts 741b, 741b protruding from side surfaces of a coupling part 741a to the left and right in place of the sector gear parts 541b, 541b. In end portions of the arm parts 741b, 741b, coupling holes 741d, 741d that are elongated in the left and right direction are formed. At the outside of a fitting part 542b of a slide base 542 housed in the casing 510 slidably in the front and back direction, the coupling part 741a of the output gear 741 is fitted, whereby the output gear 741 is rotatably supported by the slide base 742.

A drive power transmission part 760 has, in place of the rack member 561 of the drive power transmission part 560 of the double axis actuator 50, a coupling member 761 as a movable part. In the coupling member 761, a main part 761a and a coupling pin 761b protruded from the main part 761a upward are integrally formed, and the main part 761a has a force-fit hole 761c which opens to the back end surface. A force-fit part 562a of a lead screw 562 which is similar to that in the double axis actuator 50 is forced into the force-fit hole 761c of the main part 761a. Hereby, the coupling member 761 is fixed to the front end portion of the lead screw 762. In addition, the drive power transmission part 760 includes a cylindrical gear 563, a ball bearing 564, and a transmission gear 565, which are similar to those in the double axis actuator 50. Rotation of a drive source (brushless motor) 550 is converted into linear motion in the front and back direction of the lead screw 562 through the transmission gear 565 and the cylindrical gear 563, so that the coupling member 761 fixed to the front end of the lead screw 562 is moved in the front and back direction. Further, the coupling pin 761b of the coupling member 761 is engaged with the coupling hole 741d of the arm part 741b of the output gear 741 slidably. As described above, it is necessary for the drive part to include the drive source 550 and the coupling member 761.

Therefore, when the two coupling members 761, 761 move in the same phase, that is, in the same direction and by the same distance, the output gear 741 moves in the front and back direction without rotating. Further, when the two coupling members 761, 761 move in reversed phase, that is, in the opposite directions and by the same distance, the output gear 741 rotates without moving in the front and back direction.

The coupling part 741a of the output shaft 741 of the double axis actuator 70 is fitted in the inside of the fitting recess part 38a of the coupling boss 38 of the lamp unit 30, whereby the lamp unit 30 is coupled to the double axis actuator 70, and tiled by the drive of the double axis actuator 70 along each of two planes that are orthogonal to each other.

Figure 8:
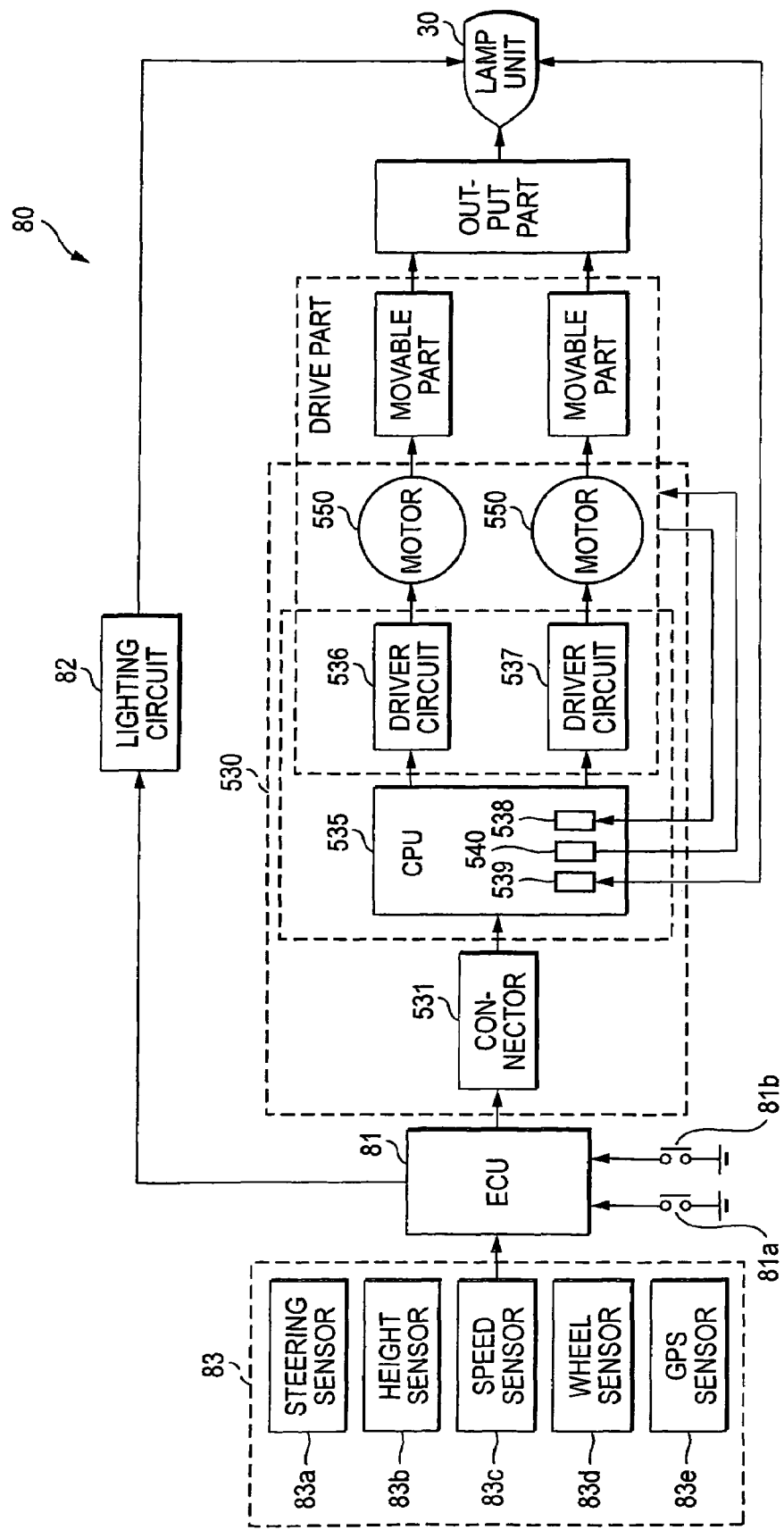
FIG. 8 is a block diagram of a control circuit.

FIG. 8 shows an example 80 of a control circuit which controls the whole of a headlamp system including the lamp unit 30.

The control circuit 80 includes an ECU 81 which controls the whole of a headlamp system including the lamp unit 30. To the ECU 81, an ignition switch 81a and a lamp switch 81b are connected. When the lamp switch 81b is switched on in a state where the ignition switch 81a is switched on, a lighting command is given from the ECU 81 to a lighting circuit 82. Hereby, the discharge bulb 33 of the lamp unit 30 is switched on by the lighting circuit 82, and beams having the predetermined luminous distribution patterns are applied ahead.

To the ECU 81, signals from various sensors 83 are inputted. For example, signals from a steering sensor 83a, a height sensor 83b, a speed sensor 83c, a wheel sensor 83d, and a GPS sensor 83e are inputted there. Information relating to a steering direction and a steering angle in steering operation are inputted from the steering sensor 83a, information relating to the respective heights of front and back wheels are inputted from the height sensor 83b, information relating to vehicle speed is inputted from the vehicle sensor 835c, information relating to height of each wheel is inputted from the wheel sensor 83d, and information relating to the present position on the basis of a global positioning system is inputted from the GPS sensor 83e. The ECU 81, on the basis of the information from each sensor 83, feeds out the predetermined control signal to the double axis actuator 50 or 70 so that the irradiation direction becomes optimum, and the double axis actuator 50 or 70 receives the control signal from the ECU 81 through one connector 531.

On the circuit board 530, a CPU (Central Processing Unit) 535 into which a control program is set up is mounted, and the predetermined control signal is transmitted from the ECU 81 through the connector 531 to the CPU 535. The CPU 535, on the basis of the control signal obtained from the ECU 81, transmits predetermined signals to respective driver circuits 536, 537 constituted on the circuit board 530, so that the two motors 550, 550 are separately driven by each driver circuit 536, 537. The drive of the motors 550, 550 moves the movable parts (rack members 561, 561 or coupling members 761, 761), and the movement of the movable parts rotates and/or moves the output parts 540, 540 (or 740, 740).

In the automotive headlamp 10, the lamp unit 30 is coupled at one place, that is, at the coupling boss 38, with the output part 540 or 740 (output shaft 541 or 741 of the output part 540 or 740) of the double axis actuator 50 or 70 which is the drive unit. Therefore, one drive unit can be used in almost of all kinds of lamp units which are different in shape and size, and at least many kinds of lamp units. Further, since the double axis actuator can rotate the lamp unit 30 in each plane regardless of the rotational positions of the lamp unit 30 in the two planes, there is no limit in rotation control of the lamp unit 30, so that beams can be applied in the desired direction.

Further, the lamp unit 30 is supported by the shaft 36 that is the support shaft rotatable and tiltable with respect to the housing 20 (through the bracket 40), and the output part 540 or 740 (output shaft 541 or 741 of the output part 540 or 740) is coupled to the portion located on the opposite side to the portion where the lamp unit 30 is coupled to the shaft 36. By the rotation of the output part, a first drive mode in which the lamp unit 30 is rotated about the shaft 36 is formed. By the linear movement of the output part in a direction substantially orthogonal to the axial direction of the shaft 36, a second drive mode in which the lamp unit 30 is tilted together with the shaft 30 is formed. Therefore, the support structure of the lamp unit 30 with respect to the housing 20 is simplified, which contributes to cost reduction.

Further, (the output shaft 541 or 741 of) the output part 540 or 740 is located on the vertical plane including the optical axis x-x of the lamp unit 30. Therefore, the lamp units having the same structure can be used for right and left vehicle lamps, which contributes to the cost reduction.

Furthermore, the drive unit 50 or 70 includes the two drive sources 550, 550 and the rack members 561, 561 or the coupling members 761, 761 which are two movable parts moved separately by the drive sources; both the two drive sources and the two movable parts are arranged in right and left symmetry with the vertical plane along the linear movement direction of the output part; the two movable parts are moved in reversed phase, whereby the output part rotates; and the two movable parts are moved in the same phase, whereby the output part moves linearly. Therefore, the driving units having the same structure can be used in the left and right lamp units, which contributes to the cost reduction.

Further, the automotive head lamp 10 has a failsafe function. Namely, in case that one of the two motors 550, 550 breaks down, the other motor 550 is driven, whereby the rack member 561 or the coupling member 761 moved by the motor 550 is moved backward, and at least the lamp unit 30 can be tilted downward, so that it is prevented that a driver in a car running on the opposite lane is dazzled by the headlights.

One example of the failsafe function will be described with reference to FIG. 8.

For example, the CPU 535 is provided with an abnormality sensor 538 which detects abnormality that control of the predetermined position of the lamp unit 30 is impossible, an irradiation position sensor 539 which detects an irradiation position of the lamp unit 30, and an abnormal time position controller 540 which drives one drive part which operates normally when the abnormality is produced.

As abnormality that the lamp unit 30 does not move to the predetermined irradiation position, there are, for example, trouble of the driver circuit 536 or 537, trouble or lock of the motor 550, and lock or breakdown of the movable part 561 or 761. The abnormality sensor 538, when, for example, the above abnormality is produced, detects its abnormality.

In case that the abnormality has detected by the abnormality sensor 538, the irradiation position of the lamp unit 30 is detected by the irradiation position sensor 539. In case that the lamp unit 30 is located in the predetermined irradiation position, that is, in an upper limit position where the glare is not given to a driver in a car running on the opposite lane and in a position below the upper limit position, the lamp unit 30 is left as it is. In case that the lamp unit 30 is located above the predetermined irradiation position, the abnormal time position controller 540 drives the drive part in which the abnormality is not produced, and controls the lamp unit 30 so that the irradiation position becomes the predetermined irradiation position and below. Namely, the rack member 561 or the coupling member 761 of the drive part which operates normally is moved backward.

Figure 9:
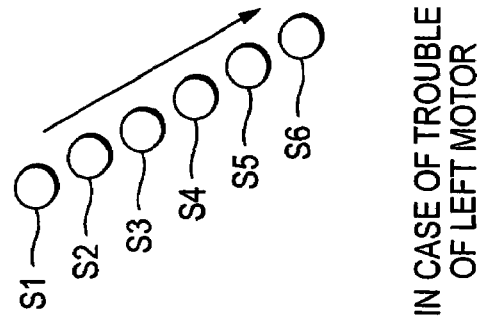
FIGS. 9(a) to 9(c) are luminous distribution diagrams showing a control method of an irradiation position.
Figure 9:
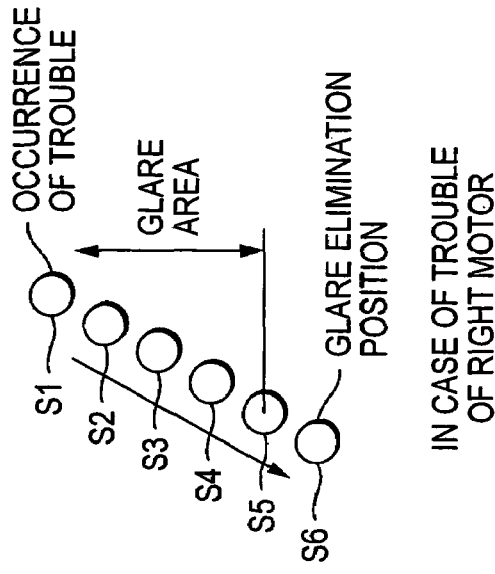
Figure 9:
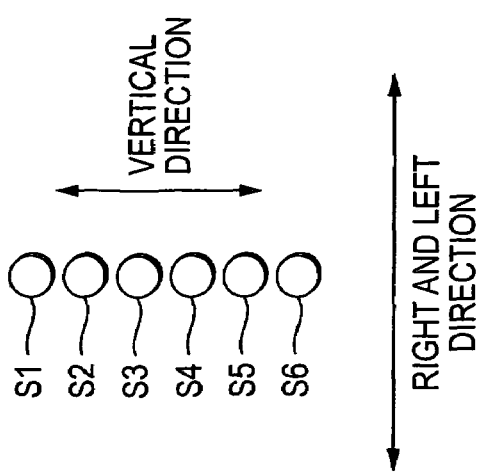

The concrete operation of the above failsafe function will be described with reference to FIGS. 9(*a*) to 9(*c*). FIGS. 9(*a*) to 9(*c*) show center spot lights of luminous distribution patterns irradiated on a screen located forward of the vehicle. Namely, S1 to S2 show the irradiation position divided into six equal divisions in the vertical direction, wherein S1 shows an uppermost irradiation position, and S6 shows a lowermost irradiation position.

FIG. 9(*a*) shows an irradiation position changing operation in the normal time, in which both the position change in the vertical direction and the position change in the left and right direction are performed linearly as shown by arrows. In case that the position change in the vertical direction and the position change in the left and right direction are performed simultaneously, the spot light S moves obliquely.

FIG. 9(*b*) shows a case where abnormality is produced in the drive part on the right side in the running direction. In this case, the drive part on the left side is operated to control the irradiation position. By moving the left movable part 561 or 761 backward, the spot light S lowers toward the lower left. Further, FIG. 9(*c*) shows a case where abnormality is produced in the drive part on the left side in the running direction. In this case, the drive part on the right side is operated to control the irradiation position. By moving the right movable part 561 or 761 backward, the spot light S lowers toward the lower right. For example, in FIG. 9(*b*), in case that the glare is produced in upper areas from S5 (glare area), the normal drive part is driven till the irradiation position becomes S6 and below.

In the failsafe function, the irradiation position of the lamp unit 30 is also detected, and in the abnormal time, the lamp unit 30 is controlled so that its irradiation position becomes the predetermined position or below. However, in the abnormal time, by driving the normal drive part, the control to make the irradiation position as downward as possible may be performed. This comes from a though of preventing at least the glare.

In the above embodiment, the brushless motor is used as the drive source of the double axis actuator 50, 70. However, this does not mean that the drive source is limited to the brushless motor. Even in case that the motor is used as the drive source, for example, a DC (direct current) motor or a stepping motor can be used, or drive sources other than the motor can be also used.

Figure 10:
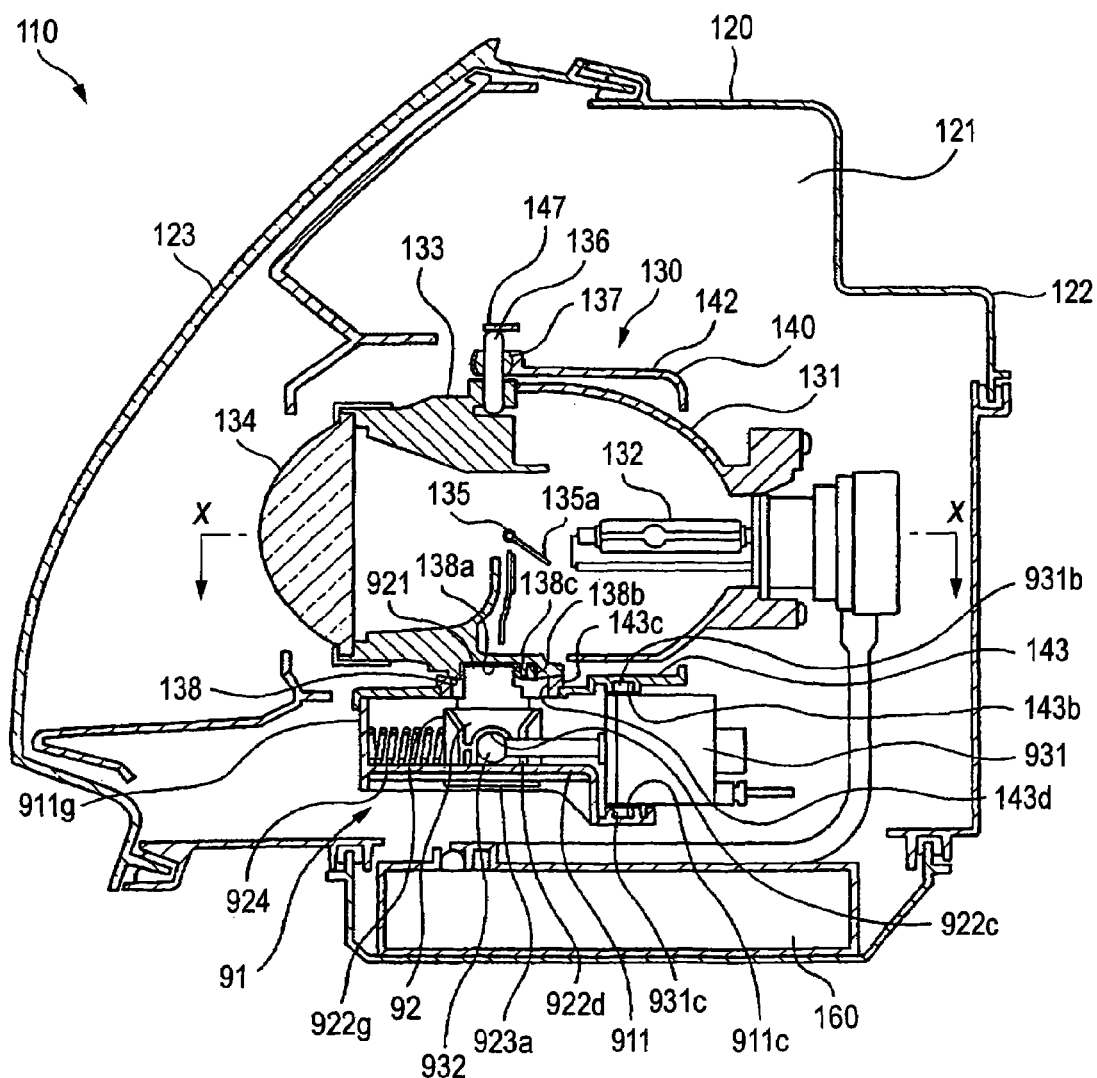
FIG. 10 shows a second exemplary embodiment together with FIGS. 11 to 12(e), in which the vehicle lamp is applied to the automotive headlamp.
Figure 11:
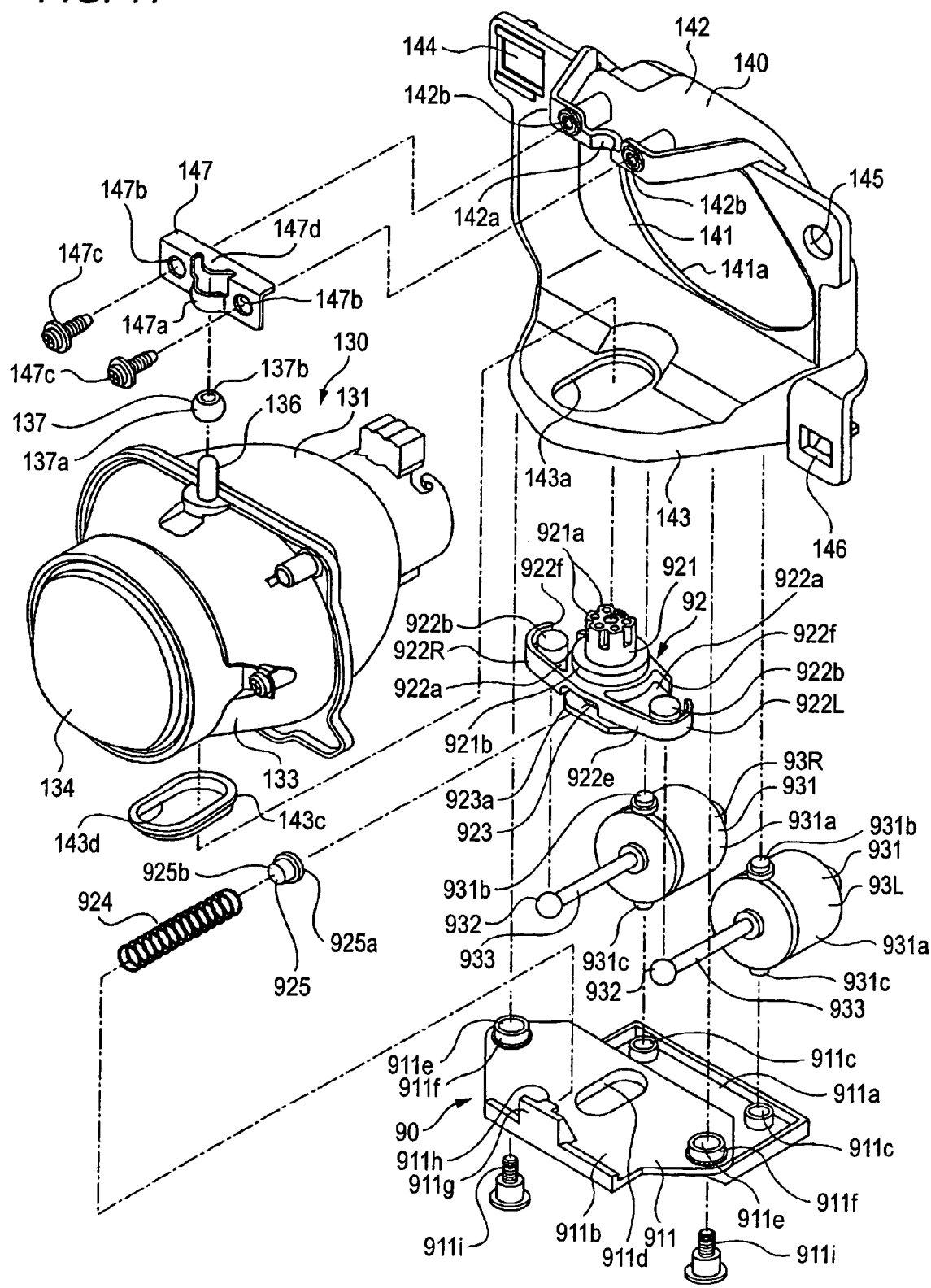
FIG. 11 is an exploded perspective view of a main part.
Figure 12:
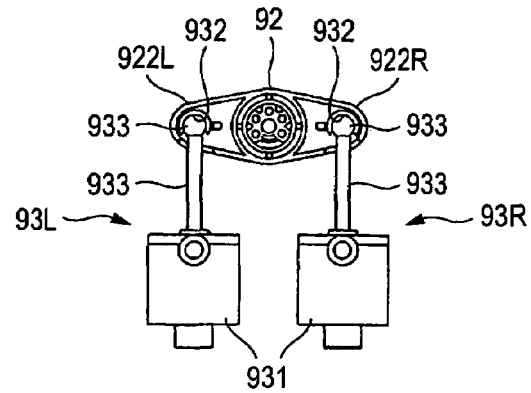
FIGS. 12(a) to 12(e) are schematic plan views showing states of a drive unit in each irradiation position (a) to (e) in control of an irradiation position.
Figure 12:
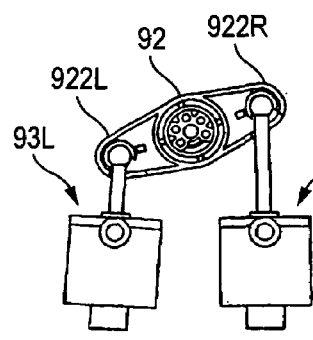
Figure 12:
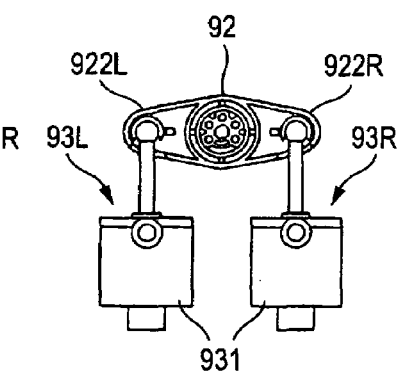
Figure 12:
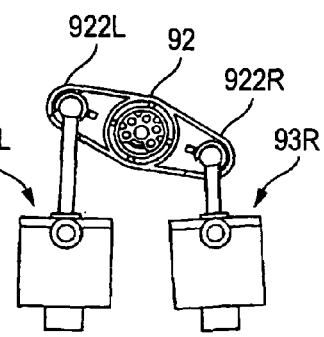
Figure 12:
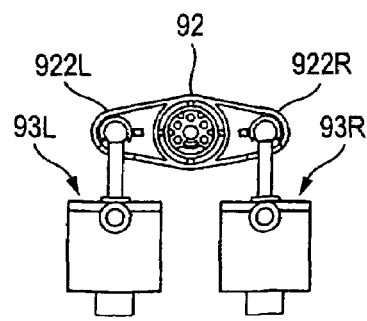

FIGS. 10 to 12 show a second exemplary embodiment in which the vehicle lamp is applied to the automotive headlamp.

Au automotive headlamp 110 has substantially the same structure as that of the automotive headlamp 10. Namely, a lamp unit 130 similar to the lamp unit 30 is arranged in a lighting room 121 of a housing 120, and the lighting room 121 is formed by covering the front of a lamp body 122 with a transparent cover 123.

The lamp unit 130 is supported through a bracket 140 by the lamp body 122 tiltably in the vertical direction and in the right and left direction. However, the lamp unit 130 may be directly supported by the lamp body 22 rotatably in the vertical direction and in the right and left direction.

A double axis actuator 90 which is a drive unit is supported by the bracket 140, and the lamp unit 130 supported by the bracket 140 rotatably in the vertical direction and in the right and left direction is coupled to an output part of the double axis actuator 90.

Further, in the housing 120, a discharge bulb switching circuit 160 is arranged, and the lamp unit 130 is switched on by the discharge lamp switching circuit 160.

As known from FIGS. 10 and 11, the lamp unit 130 includes a reflector 131, a discharge bulb 132 supported by the reflector 131, a coupling part 133 attached onto a front end of the reflector 131, a projection lens 134 arranged so as to cover an opening located at a front end of the coupling part 133, and a shade 135 provided for the coupling part 133. The light which is emitted from the discharge bulb 132 and reflected by the reflector 131 is condensed in the vicinity of an upper edge 135*a* of the shade 135. The condensed light is projected forward by the projection lens 134 having a focus in the vicinity of the upper edge 135*a* of the shade 135, whereby a beam having the predetermined luminous distribution pattern is formed. The luminous distribution pattern has, on its upper edge, a cut-off line limited by the upper edge 135*a* of the shade 135.

From the upper surface of the coupling part 133, a shaft 136 is protruded upward, and a self-aligning metal 137 is fitted at the outside of the shaft 136. The self-aligning metal 137 has a peripheral surface 137*a* having a substantially spherical shape, and a center hole 137*b*, and the shaft 136 is inserted into the center hole 137*b* slidably.

In a position of the lower surface of the coupling part 133 corresponding to the shaft 136, a coupling boss 138 is projected. The coupling boss 138 has a substantially circular outer shape viewed in the vertical direction, and includes a fitting recess part 138*a* which opens to the lower surface. On the inner surface of the fitting recess part 138*a*, not-shown plural engagement notches are provided.

A line connecting an axis of the shaft 136 and an axis of the coupling boss 138 is located on a vertical plane where an optical axis x-x of this lamp unit 130 is located.

The bracket 140, as known from FIGS. 10 and 11, includes a main part 141 formed in the shape of a saucer which opens forward and has a big opening 141*a*, an upper support piece 142 which projects from the upper end of the main part 141 forward, a lower support piece 143 which projects from the lower end of the main part 141 forward, and coupling pieces 144, 145, 146 which project from three corner portions of the main part 141.

In the center in the left and right direction of the front end portion of the upper support piece 142, a support recess part 142*a* which dents forward is formed. The forward facing surface of the support recess part 142a is formed in the shape of a concave spherical surface. On both sides of the front end surface of the upper support piece 142 with the support recess part 142a between, threaded holes 142b, 142b are formed. Onto the front end portion of the upper support piece 142, a metal holder 147 is attached. In the center portion in the left and right direction of the metal holder 147, a press part 147a that dents backward is formed. The backward facing surface of the press part 147a is formed in the shape of a concave spherical surface. On both sides of the metal holder 147 with the press part 147a between, screw insertion holes 147b, 147b are formed. Further, at the upper edge portion of the metal holder 147, a regulating part 147d which protrudes backward is formed. In a state where the metal holder 147 is brought into contact with the front end of the upper support piece 142, and the regulating part 147d covers the upsides of the press part 147a and the support recess part 142a, screws 147c, 147c inserted from the front side into the screw insertion holes 147b, 147b are tightened into the threaded holes 142b, 142b of the upper support piece 142, whereby the metal holder 147 is attached onto the front end portion of the upper support piece 142. Hereby, between the support recess part 142a of the upper support piece 142 and the press part 147a of the metal holder 147, a spherical reception concavity is formed.

In a position near the front end of the lower support piece 143, an elongated hole 43a which is elongated in the front and back direction is formed. The nearly central portion in the front and back direction of this elongated hole 143a is located in a position to which the position where the reception concavity is formed corresponds in up-down relation. Into the elongated hole 143a, a thrust metal 143c is fitted. The outer size of the coupling boss 138 is larger than a sliding groove 143d which is formed in the thrust metal 143c and is long back and forth.

The coupling boss 138 of the lamp unit 130 is placed on the thrust metal 143c supported by the lower support piece 143 of the bracket 140, and the self-aligning metal 137 fitted at the outside of the shaft 136 protruding from the upper surface of the lamp unit 130 is rotatably supported by the support recess part 142a of the upper support piece 142 of the bracket 140 and the press part 147a of the metal holder 147. Hereby, the lamp unit 130 is supported through the bracket 140 by the lamp body 122 rotatably in two planes that are orthogonal to each other. Namely, the lamp unit 130 can rotate in the plane orthogonal to an axis connecting the shaft 136 and the coupling boss 138 around the axis. Further, by the front and back movement of the coupling boss 138 along the sliding groove 143d, the lamp unit 130 can rotate in the plane including the axis connecting the shaft 136 and the coupling boss 138 and an axis passing through the center in the width direction of the sliding groove 143d and extending back and forth.

The bracket 140 is supported by the lamp body 122 tiltably in the vertical direction and in the left and right direction. Further, since the attaching method of the bracket 140 to the lamp body 122 is similar to that in the automotive headlamp 10, a drawing showing the attaching method and the description about the attaching method are omitted.

The above double axis actuator 90 is supported by the bracket 140 on the downside of the lower support piece 143 of the bracket 140.

In the double axis actuator 90, two drive parts and a single output part are arranged in a casing 91. The casing 91 is constituted by the lower support piece 143 of the bracket 140 and a lower casing 911 fixed onto the lower surface side of the lower support piece 143. The lower casing 911 is formed by integrally forming a motor arranging part 911a and an output part arranging part 911b extending from the front end of the motor arranging part 911a forward. Onto the upper surface of the motor arranging part 911a which is nearly plate-shaped, two fulcrum recess parts 911c, 911c are formed, which are spaced left and right. The output part arranging part 911b which is nearly plate-shaped is located in a position which is slightly higher than the position of the motor arranging part 911a, and has, in its center portion in the left and right direction, a sliding hole 911d extending in the front and back direction. Further, in left and right end portions of the output part arranging part 911b, attachment holes 911e, 911e are formed. From peripheral edges of the attachment holes 911e, 911e, collars 911f, 911f are protruded upward. Further, from the center portion in the left and right direction of the front end of the output part arranging part 911b, a stopper 911g is protruded upward. The stopper 911g has a projection 911h which protrudes backward.

Attachment screws 911i, 911i inserted from the downside into the attachment holes 911e, 911e of the lower casing 911 are tightened into not-shown threaded holes formed on the lower surface of the lower support piece 143 of the bracket 140. Hereby, the lower casing 911 is fixed to the bracket 140, and the collars 911f, 911f keep the space between the lower casing 911 and the lower support piece 143 of the bracket 140 at the predetermined value. Thus, the casing 91 of the double axis actuator 90 is formed.

In the above casing 91, a single output part 92 and a left and right pair of drive parts 93L, 93R are arranged.

The output part 92 is formed by integrally forming an output shaft 921 coupled to the coupling boss 138 of the lamp unit 30, coupling wings 922L, 922R to which the drive parts 93L, 93R are coupled, and a guided part 923 which engages with the sliding hole 911d of the casing 91 slidably.

The output shaft 921 forms the cylindrical shape of which an axial direction extends up and down. On the peripheral surface of upper half portion of the output shaft 921, plural engaging projected-rims are formed, extending in the vertical direction. A lower end portion 921b of the output shaft 921 is larger in diameter than other portions.

The coupling wings 922L, 922R continue from the lower end of the output shaft 921 integrally, wherein the coupling wing 922L protrude to the left and the coupling wing 922R protrude to the right. On each of coupling wings 922L, 922R, a recess part 922a of which the upper surface is opened is formed. From the nearly central portion of the recess part 922a, a joint part 922b is protruded. Inside the joint part 922b, a dome-shaped space 922c is formed, which has an opening 922d at its back. Of a peripheral wall 922e defining the space 922a, in a position opposed to the back opening 922d of the joint part 922b, a notch 922f is formed. In the front surface of the center portion where the two coupling wings 922L and 922R are coupled, a recess part which opens forward is formed, and the back surface of the recess part becomes an abutment surface 922g.

The guided part 923 forms the nearly cylindrical shape, and its outer diameter is nearly equal to the width of the sliding hole 911d formed in the lower casing 911. At the lower end of the guided part 923, a drop-out preventing plate 923a is formed.

In the output part 92, its guided part 923 is engaged with the sliding hole 911d of the lower casing 911 slidably. The output shaft 921 is inserted from the downside into the sliding groove 143d of the thrust metal 143c fitted into the elongated hole 143a of the lower support piece 143 of the bracket 140, and fitted into the fitting recess part 138a of the coupling boss 138 of the lamp unit 130. At this time, the engaging projected-rims 921a of the output shaft 921 engaged with not-shown plural engagement notches formed on the inner surface of the fitting recess part 138a. Further, a leading end 138c of a spring 138b attached to the coupling boss 138 is laid between the output shaft 921 and the wall surface of the fitting recess part 138a, thereby to absorb play between the output shaft 921 and the fitting recess part 138a. Between the output part 92 and the casing 91, a compression coil spring 924 for energizing the output part 92 backward is inserted. Namely, a disc-shaped contact part 925a of a contact member 924, from the front surface of which a bearing shaft 925b protrudes, is brought into contact with the abutment surface 922g formed on the front surface of the output part 92. At the outside of the bearing shaft 925b of the contact member 925 in such the state, the back end portion of the compression coil spring 924 is fitted. Further, the front end portion of the compression coil spring 924 is fitted at the outside of the projection 911h of the stopper 911g provided at the front end portion of the lower casing 911, whereby the compression coil spring 924 is put in a compressed state between the stopper 911g and the output part 92. By this compression coil spring 924, the output part 92 is energized backward, whereby the play in the front and back direction is absorbed.

Though the two drive parts 93L and 93R are different in arrangement position, they have the same structure. Namely, the drive part 93 has a linear motor 931 as a drive source, and a spherical part 932 as a movable part. The linear motor 931 is so constituted that a movable shaft 933 moves in the front and back direction by drive of the linear motor 931. The spherical part 932 is formed integrally at the front end of the movable shaft 933. In positions near the front end of an outer case 931a of the linear motor 931, fulcrum shafts 931b, 931c protruding up and down are formed. The upper fulcrum shaft 931b of the linear motor 931 is rotatably fitted into a fulcrum recess part 143b formed on the back lower surface of the lower support piece 143 of the bracket 140, and the lower fulcrum shaft 931c of the linear motor 931 is rotatably fitted into the fulcrum recess part 911c formed in the motor arrangement part 911a of the lower casing 911. Hereby, the linear motor 931 is supported in the motor arrangement part 911a swingably in the left and right direction. Further, the spherical part 932 is fitted into the dome-shaped space 922c inside the joint part 922b of the output part 92 in a rotatable state. The movable shaft 933 extends backward through the back opening 922 of the joint part 922b and the notch 922f formed in the peripheral wall 922e. As described above, the two drive parts 93L, 93R and the output part 92 are linked to each other.

Next, the operation of the double axis actuator 90 will be described referring mainly to FIGS. 12(a) to 12(e). FIGS. 12(a), 12(b), and 12(c) show states where a beam is applied toward the center in the left and right direction, FIG. 12(d) located on the left side shows a state where a beam is applied to the left, and FIG. 12(e) located on the right side shows a state where a beam is applied to the right. FIGS. 12(a), (d) and (e) located in the middle stage show a state where a beam is applied to the upper limit position where the glare is not produced.

As described above, FIG. 12(a) shows the state where the beam is applied toward the center in the left and right direction and to the upper limit position where the glare is not produced. In this state, the movable shafts 933 and 933 of the left and right movable parts 93L and 93R protrude from the linear motors 931, 931 by the same length. Accordingly, the coupling wings 922L, 922R of the output part 92 are located in the same position in the front and back direction. In case that the irradiation position is changed from this state of FIG. 12(a) to the upward position, the movable shafts 933 and 933 of the left and right movable parts 93L and 93R are protruded more from the linear motors 931, 931 by the same length (state of FIG. 12(b)). Further, in case that the irradiation position is changed from the state of FIG. 12(a) to the downward position, the movable shafts 933 and 933 of the left and right movable parts 93L and 93R are pulled into the linear motors 931, 931 by the same length (state of FIG. 12(c)). In case that the irradiation position is changed from the above state of FIGS. 12(a), 12(b) or 12(c) to the left, the movable shaft 933 of the left movable part 93L is pulled into the linear motor 931, and the movable shaft 933 of the right movable part 93R is protruded more from the linear motor 931 (state of FIG. 12(d)). Hereby, the leading end of the left coupling wing 922L moves backward, and the leading end of the right coupling wing 922R moves forward. Therefore, the output shaft 921 formed integrally with the coupling wings 922L, 922R rotates counterclockwise, and the lamp unit 130 coupled to this output shaft 921 is tiled to the left. At this time, the distance between the joint parts 922b, 922b of the coupling wings 922L, 922R becomes narrow in the arrangement direction of the linear motors 931, 931. Therefore, since the spherical parts 932, 932 of the drive parts 93L, 93R come close to each other in the arrangement direction of the linear motors 931, 931, the linear motors 931, 931 tilt around their fulcrum shafts 931b, 931c so that their front ends come close to each other. In case that the irradiation position is changed from the above state of FIGS. 12(a), 12(b) or 12(c) to the right, the movable shaft 933 of the right movable part 93R is pulled into the linear motor 931, and the movable shaft 933 of the left movable part 93L is protruded more from the linear motor 931 (state of FIG. 12(e)). Hereby, the leading end of the right coupling wing 922R moves backward, and the leading end of the left coupling wing 922L moves forward. Therefore, the output shaft 921 formed integrally with the coupling wings 922L, 922R rotates clockwise, and the lamp unit 130 coupled to this output shaft 921 is tiled to the right. At this time, the distance between the joint parts 922b, 922b of the coupling wings 922L, 922R becomes narrow in the arrangement direction of the linear motors 931, 931. Therefore, since the spherical parts 932, 932 of the drive parts, 93L, 93R come close to each other in the arrangement direction of the linear motors 931, 931, the linear motors 931, 931 tilt around their fulcrum shafts 931b, 931c so that their front ends come close to each other.

The double axis actuator 90 in the automotive headlamp 10 according to the second exemplary embodiment absorbs, by swinging of the linear motors 931, 931, deviation in the arrangement direction of the linear motors 931, 931 (states in FIGS. 12(d), 12(e)) which is produced in the left and right ends of the output part 92 by the rotation of the output part 92. Therefore, without applying bending stress to the movable shafts 933, 933, the poor operation and generation of the play can be reduced.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A drive unit for actuating a lamp unit, the drive unit comprising:

a single output part for coupling to the lamp unit;

a drive for driving the single output part; and
a slide base which is linearly movable, the single output part being supported by the slide base and rotatable with respect to the slide base,
wherein the single output part is adapted to move such that the lamp unit is rotatable independently about two perpendicular axes such that the lamp unit is rotatable in two orthogonal planes.

2. The drive unit according to claim 1, wherein the single output part is adapted to rotate about its axis and move linearly in a direction substantially perpendicular to said axis.

3. A drive assembly for actuating the lamp unit, the drive assembly comprising:
the drive unit according to claim 1; and
a support for supporting the lamp unit movably about a reference position.

4. The drive assembly according to claim 3, wherein the support includes a gimbal.

5. A lamp assembly comprising:
the drive assembly according to claim 3; and
a lamp unit,
wherein the lamp unit is supported by the support and the single output part of the drive unit is coupled with the lamp unit on an opposite side of the lamp unit to the support.

6. The lamp assembly according to claim 5, wherein the support includes a support shaft, the lamp unit being adapted to be rotated in the first plane around the support shaft, and rotated in the second plane together with the support shaft.

7. A lamp assembly according to claim 5, wherein the axis of the single output part intersects an optical axis of the lamp unit.

8. A lamp assembly comprising:
the drive unit according to claim 1; and
a lamp unit coupled with the single output part of the drive unit.

9. A vehicle lamp assembly comprising:
the drive unit according to claim 1;
an abnormality sensor that detects an abnormality of the drive unit;
an irradiation position sensor that detects an irradiation position in a vertical direction of the lamp unit; and
an abnormal time position controller that positions the lamp unit below a predetermined irradiation position in the vertical direction in case that the abnormality sensor detects abnormality of the drive unit.

10. A drive unit for actuating a lamp unit, the drive unit comprising:
a single output part for coupling to the lamp unit; and
a drive for driving the single output part,
wherein the single output part is adapted to move such that the lamp unit is rotatable independently in two orthogonal planes and further wherein the single output part is adapted to rotate about its axis and move linearly in a direction substantially perpendicular to said axis;
wherein the drive includes two drive sources and two movable transmission elements independently associated respectively therewith, the single output part being driven by movement of the transmission elements.

11. The drive unit according to claim 10, wherein the transmission elements are arranged such that when the transmission elements are moved in opposing phase the single output part rotates, and when the transmission elements are moved in the same phase the single output part moves linearly.

12. The drive unit according to claim 10, wherein the single output part is connected to the two transmission elements via respective arms.

13. The drive unit according to claim 12, wherein the arms respectively include coupling holes that are elongated radially about the axis of the single output part.

14. The drive unit according to claim 10, wherein the two drive sources are respectively supported rotatably in the right and left direction.

15. A drive unit for actuating a lame unit, the drive unit comprising:
a single output part for coupling to the lamp unit;
a drive for driving the single output part, wherein the single output part is adapted to move such that the lamp unit is rotatable independently in two orthogonal planes; and
a control circuit for controlling the drive, based on a signal from a sensor, such that the lamp unit is selectively rotatable in one of the two orthogonal planes.

16. The drive unit according to claim 15, further comprising:
a connector that receives a control signal from a sensor,
wherein the single output part, the drive, the control circuit and the connector are accommodated in a housing.

* * * * *